(12) United States Patent
Thomsen et al.

(10) Patent No.: US 6,389,375 B1
(45) Date of Patent: May 14, 2002

(54) VIRTUAL REALITY MODELLING

(75) Inventors: Michael Thomsen, Randbøl; Poul Krogh, Ry, both of (DK)

(73) Assignee: Interlego AG, Baar (CH)

( * ) Notice: Subject to any disclaimer, the term of this patent is extended or adjusted under 35 U.S.C. 154(b) by 0 days.

(21) Appl. No.: 09/235,281

(22) Filed: Jan. 22, 1999

(51) Int. Cl.[7] .............................................. G06F 17/50
(52) U.S. Cl. .......................... 703/2; 703/7; 707/102; 707/103; 345/433; 345/473
(58) Field of Search .................... 703/1, 2, 7; 707/102, 707/103, 104; 345/419, 433, 473

(56) References Cited

U.S. PATENT DOCUMENTS

| | | | |
|---|---|---|---|
| 5,611,000 A | * 3/1997 | Szeliski et al. | 382/294 |
| 5,764,241 A | * 6/1998 | Elliott et al. | 345/473 |
| 5,764,814 A | * 6/1998 | Chen et al. | 382/243 |
| 5,963,956 A | * 10/1999 | Smartt | 707/104 |
| 6,005,582 A | * 12/1999 | Gabriel et al. | 345/430 |
| 6,064,393 A | * 5/2000 | Lengyel et al. | 345/427 |
| 6,075,875 A | * 6/2000 | Gu | 382/107 |

FOREIGN PATENT DOCUMENTS

EP            0 903 698        3/1999 ........... G06T/17/00

* cited by examiner

Primary Examiner—Kevin J. Teska
Assistant Examiner—T. Phan
(74) Attorney, Agent, or Firm—Finnegan, Henderson, Farabow, Garrett & Dunner, L.L.P.

(57) ABSTRACT

A model of a geometrical object comprising: bits in a first data structure encoded to identify a first set of elements from a collection of representations of geometrical shapes for a collection of elements and to represent positions of the elements by means of integer co-ordinates in a first system of co-ordinates; bits in a second data structure encoded to identify a second set of elements from said collection and to represent positions of the elements by means of integer co-ordinates in a second system of co-ordinates; bits in a third data structure encoded to represent a spatial transformation of the second system of co-ordinates relatively to the first system of co-ordinates. Thereby it is possible to create a very compact representation of a model of a geometrical object. The model—prima facia—seems to be constrained very hard, but is in fact a very flexible and easy to access model.

89 Claims, 14 Drawing Sheets

VIRTUAL REALITY MODELLING

FIELD OF THE INVENTION

This invention relates to the field of computer aided modelling of a virtual reality by means of predefined geometrical elements.

BACKGROUND OF THE INVENTION

Computer aided modelling of a virtual reality is the task of creating a model of a geometrical object, interpreting the model, manipulating the model, and otherwise handling a model of a geometrical object in a computer system.

From a first point of view, modelling of a virtual reality is an interesting topic in that it makes it possible to visualise ideas before they are actually implemented in the real world. If the virtual reality model is sufficiently easy to modify much time can be saved in the process of developing and refining a geometrical object compared to a situation where the same process should have been carried in the real world. A simple task of painting an object in the real, world may easily take several hours, whereas the computer can apply a new colour to visualise of a model within milliseconds or seconds.

From a second point of view, modelling of a virtual reality is interesting in that it makes it possible to create a model of an object that exists in the real world and via a computer visualise and e.g. manipulate the model in some sense. Thus the model of the object in the real world can be stored for different purposes e.g. for advanced documentation purposes.

Although there exists a huge amount of possible applications for computer aided virtual reality modelling, a special application is to use virtual reality modelling for entertainment or education. From the real world, long before the development of the electronic computer, various types of modelling concepts are known. Especially, concepts using modular or semi-modular concepts were, and are, very popular. Typically, these concepts provide a set of pre-manufactured elements that can be interconnected with each other in some predetermined way according to modules of the pre-manufactured elements. The pre-manufactured elements resembles well-known objects adapted to a specific modelling task. Thus in e.g. building a model of a house the elements may resemble wall bricks, roof tiles, doors, and windows. The object of selecting the elements in this way is that the work involved with the building of a model of a house is reduced significantly compared to a situation where all details of the house is to be defined each time a new model should be made. However, the complete freedom in building a house or another object is traded off for the simplicity of building the model.

This approach of having predefined elements is well known in the art of computer aided virtual reality modelling. Also, the concept of having modular elements that can be interconnected with each other is well known. But when it comes to representation in a computer of such models, the expediency of the concept of having predefined elements and modular systems is not fully accomplished in the prior art.

As long as computers have been used for computer aided design and modelling, the task requiring the largest computational effort has been visualisation of the model, including calculation of how the model should appear. One of the reasons why is that the complexity and refinements of the virtual reality models have been extended to follow the ever recent available computer technology and computationally power.

When it comes to transfer and interchange of data representing a model, the drawbacks of the complexity and refinements of the virtual reality models appear very clearly. Now some type of external unit in the form of a storage unit or a computer communication network is connected to the computer and thus extends the signal path for storing, loading and/or transmitting, receiving a model. Typically, such signal paths have a relatively low bandwidth compared to signal paths within a single computer. Thus an efficient scheme for representing a model is needed.

PRIOR ART

One scheme for representing a model of a geometrical object is the well-known 'Virtual Reality Modelling Language' also known as 'VRML'. This scheme is often used on the Internet. 'VRML' is based on some types of polygons defined by a set of parameters. All models are based on these polygons by specifying the parameters e.g. defining the position of corners of the polygons in a three-dimensional space. It is possible to define the position, orientation, and scale of a group of polygons by means of a common transformation.

By means of this modelling scheme all possible modelling tasks can be modelled as desired because the scheme does not restrict the user in any way. This in fact is also one of the drawbacks of the scheme, because every one of the polygons is supported by an extensive representation. On a computer, this representation comprises numbers of the type Real for each parameter in the model. Further, due to the nature of most modelling paradigms, an overwhelming number of polygons are needed—thus also an overwhelming number of parameters of the type Real are required. Consider e.g. a curved surface, such a surface can, in a very coarse model, be modelled by means of a single polygon, however, if a fine model is required this curved surface must be composed of a number of polygons, at least comprising so many polygons that the surface will appear with sufficient smoothness.

When it comes to manipulation of a VRML model the geometrical description must be extended with a meta-description defining each of the possible manipulations. So, if a VRML model not initially is supplied with such a meta-description no manipulations of that model are possible. This is a result of the completely free modelling scheme.

From different types of commercially marketed software products it is known to constrain elements with regard to their mutual positioning and orientation when they are used in a model. The elements are constrained to positions in a relatively coarse grid system and the elements can have an orientation constrained to 90 degrees steps around three axes in a system of co-ordinates coincident with the relatively coarse grid system.

However, firstly, in these products the representation of the models does not utilise these constraints, and therefore no efficiency regarding storage capacity relative to the complexity of the model is obtained. Secondly, this modelling scheme does not enable a model to move, rotate, or otherwise manipulate a part of a model relative to another part of the model, ie all elements are bound to the grid system.

So, there exists a problem in the prior art that models obtained by computer aided modelling require a tremendous amount of storage capacity, whether the models are constrained in some way or not.

In the prior art there exists various types of compression schemes, however, such compression schemes requires a large block of data to operate on in order to compress the data efficiently. Moreover, such compression schemes requires a relatively large time slot in carrying out compression and decompression. Typically, this is critical when it comes to interactive modelling tasks, comprising transfer of models e.g. via a computer network. Thus there is a need for a representation of geometrical models that is fast to generate and to interpret, and which do not require additional compression schemes.

SUMMARY OF THE INVENTION

A first object or the invention is to provide a compact representation of a model of a geometrical object.

A second object of the invention is to provide a compact representation of a model of a geometrical object that allows for modelling of complex objects comprising movable and/or rotatable parts.

A third object of the invention is to provide a model structure and a representation of the model structure that it is possible to generate and interpret very fast.

A fourth object of the invention is to provide a model structure and a representation of the model structure that is expedient for representing objects composed of modular toy building blocks or elements.

A fifth object of the invention is to provide a representation of a model structure that is expedient for being distributed via a computer network, in the sense of relatively low bandwidth requirement and low processing time when the model is subjected to visualisation, is generated, or manipulated.

A sixth object of the invention is to provide a model structure and a representation of the model structure which do not require an additional meta-description of a geometrical object when the model is subjected to manipulation.

According to the invention the objects mentioned in the above paragraphs are fulfilled within the scope of the invention as defined by the claims. Particularly, when a model of a geometrical object comprises: bits in a first data structure encoded to identify a first set of elements from a collection of representations of geometrical shapes for a collection of elements and to represent positions of the elements by means of integer co-ordinates in a first system of co-ordinates; bits in a second data structure encoded to identify a second set of elements from said collection and to represent positions of the elements by means of integer co-ordinates in a second system of co-ordinates; bits in a third data structure encoded to represent a spatial transformation of the second system of co-ordinates relatively to the first system of co-ordinates.

Thereby a very compact representation of a geometrical object is obtained while the model allows for modelling of complex geometrical structures comprising movable parts. In fact the model distinguish between a number of rigid parts and constrains the position of the elements within such rigid parts in order to obtain a compact representation. However, when it is needed ie to represent a spatial interrelationship between two or more of such rigid parts or segments, a non-constrained or less-constrained representation of the interrelationship can be applied. Thereby also providing a relatively flexible model representation.

Due to the integer representation of positions of the elements it is possible to process the model over and over again on a computer without introducing round-off errors within the respective systems of co-ordinates. Thus models comprising a huge amount of elements within a segment is not distorted due to such round-off errors.

Due to the fact that the model only comprises references to the geometrical representations of the elements, the model can be interpreted with a selected set of elements without modifying the model. Thereby a specific graphic format can be selected in order to be interpreted expediently on a specific computer e.g. in the sense of providing sufficiently fast rendering time when the model is subjected to displaying.

Due to the integer constrained representation of the positions of elements within the respective systems of co-ordinates possible positions of the elements are given implicitly, ie rotations, free displacements etc are not possible within a system of co-ordinates.

Since the compact representation of the model is obtained by constraints on the elements, no additional compression is needed and the model structure can thus be generated sequentially and interpreted sequentially by writing/reading a succession of statements used for representing the model.

BRIEF DESCRIPTION OF THE DRAWINGS

The invention will be explained more fully below in connection with a preferred embodiment and with reference to the drawings, in which.

DETAILED DESCRIPTION OF A PREFERRED EMBODIMENT

Figure 1:
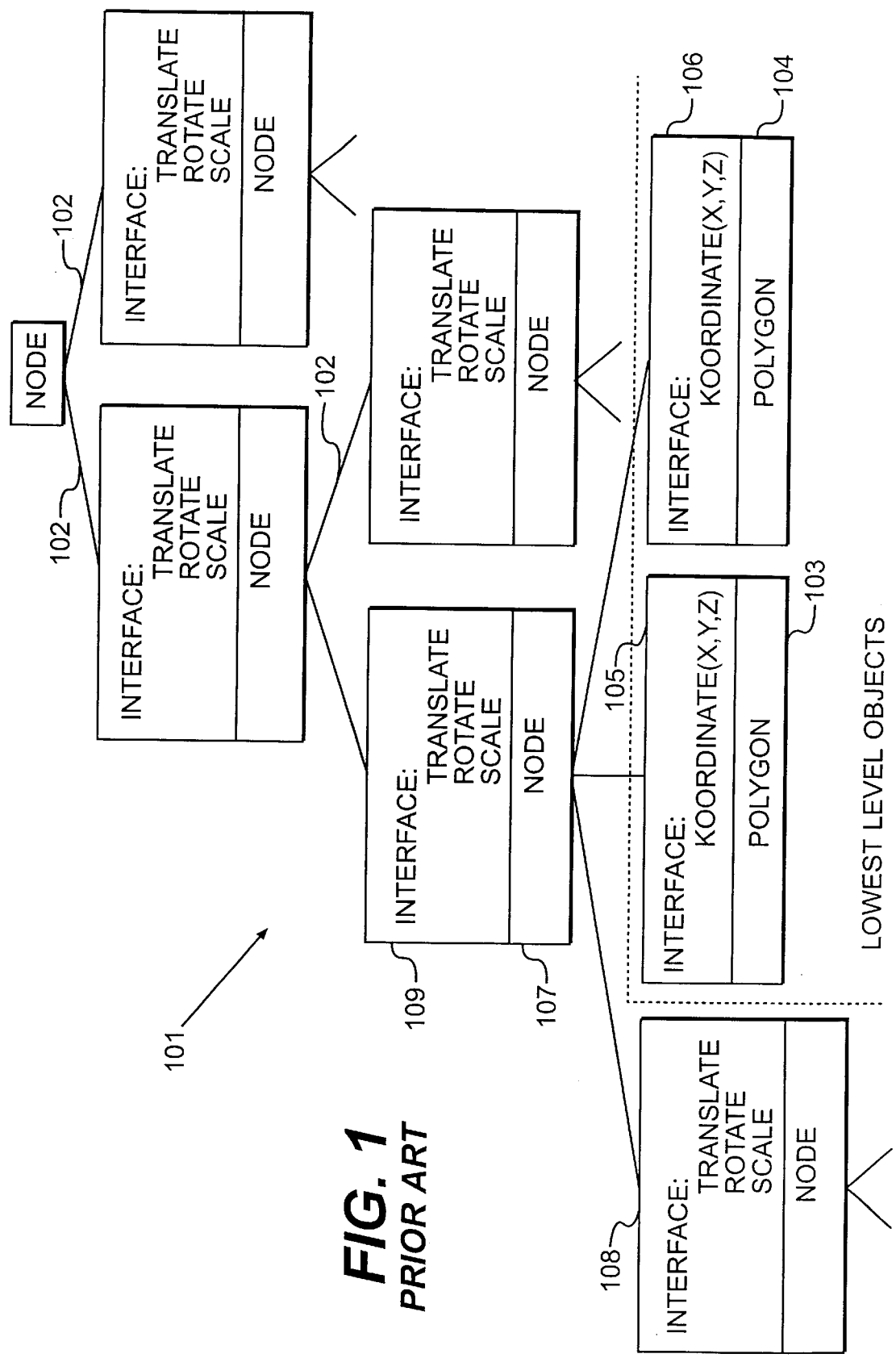
FIG. 1 shows the hierarchical structure of a model of a geometrical object according to a prior art virtual reality modelling language.

FIG. 1 shows the hierarchical structure of a model of a geometrical object, according to a prior art virtual reality modelling language. Such a virtual reality modelling language is known to a person skilled in the art as VRML. The basic elements of VRML is two-dimensional non-concave polygons defined by their co-ordinates in a three-dimensional rectangular system of co-ordinates. If the axes of a three-dimensional rectangular system of co-ordinates are denoted the x-axis, y-axis, and z-axis, respectively, a two-dimensional convex polygon which may be a rectangle is defined by the co-ordinates of the four corners of the rectangle. That is four sets of (x, y, z) co-ordinates. Due to the polygon oriented structure of VRML, a designer designing a virtual reality model of a fictive or existing real world object must divide the object into polygons. A precise and fine VRML model of an object having a curved and smooth surface must thus be compounded of a huge number of polygons in order to make the model appear as having a fine and smooth surface. However, a coarser VRML model of the object can be compounded of a smaller number of polygons, thus reducing the complexity of the model. In order for the designer to be able to model any object it must be possible to place the two-dimensional polygons freely in the three-dimensional system of co-ordinates (in the following this is also denoted the 'three-dimensional space' or just 'space'). In a computer the co-ordinates of the polygons are represented by numbers of the so-called type 'Real', ie floating point numbers.

In order to handle even rather simple models, the polygons are arranged in an up-side-down tree-structure hierarchy 101. Each branch 102 of the tree is connected to a node in order to define the hierarchy. Each node on a given level of the hierarchy is a common reference for other nodes or polygons on a lower level of the hierarchy. The hierarchy is terminated downward by polygons being the lowest level of the hierarchy.

The polygons 103 and 104 are defined by the co-ordinates x, y, and z referring to the same node 107 by means of the interfaces 105 and 106. The node 107 may also be referred to by other nodes 108 having polygons (not shown). By means of the interface part 109 of the node 107, it is possible to translate, rotate, and scale the polygons and nodes on a lower level in the hierarchy connected directly or indirectly to the node 107 by a common transformation. Thus it is possible to group a set of polygons and handle that group by means of a single transformation comprising translation, rotation, and scaling.

All parameters used in the definition of the polygons and the nodes, that is co-ordinates, translations, rotations, and scales, are of the type Real and thus represented as floating point numbers in a computer. This representation is selected in order to be capable of handling any modelling task. However, this representation requires a huge storage capacity and is in fact a clog when it comes to storage and transfer of models—including real time manipulation of models.

Figure 2A:
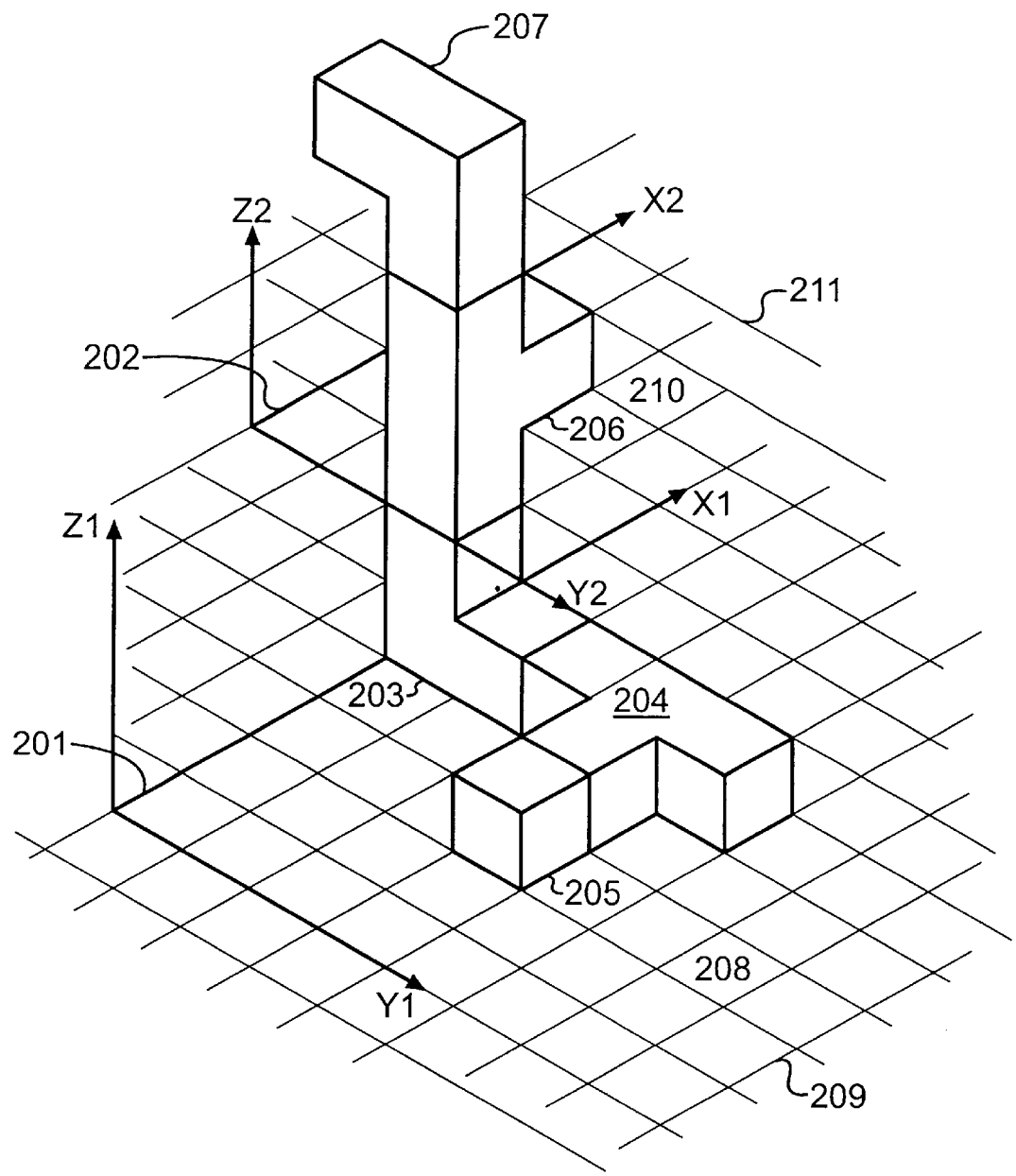
FIG. 2a shows a first object subject for modelling according to the invention.

FIG. 2a shows a simple object comprising a first and a second segment, subject to modelling according to the invention. A model of the object has two segments 201 and 202 each having elements 203, 204, 205 and 206, 207, respectively, The axes $x_1$, $y_1$, and $z_1$ span a system of co-ordinates 209 and belongs to the segment 201 and the axes $x_2$, $y_2$, and $z_2$ span a system of co-ordinates 211 and belongs to the segment 202.

Note that the elements 203, 204, and 205 of the first segment are placed only according to the modules 208 of the system of co-ordinates 209. Likewise, the elements 206 and 207 of the second segment are placed only according to the modules 210 of the system of co-ordinates 211.

The purpose of dividing the object into two segments will appear from the following.

Figure 2B:
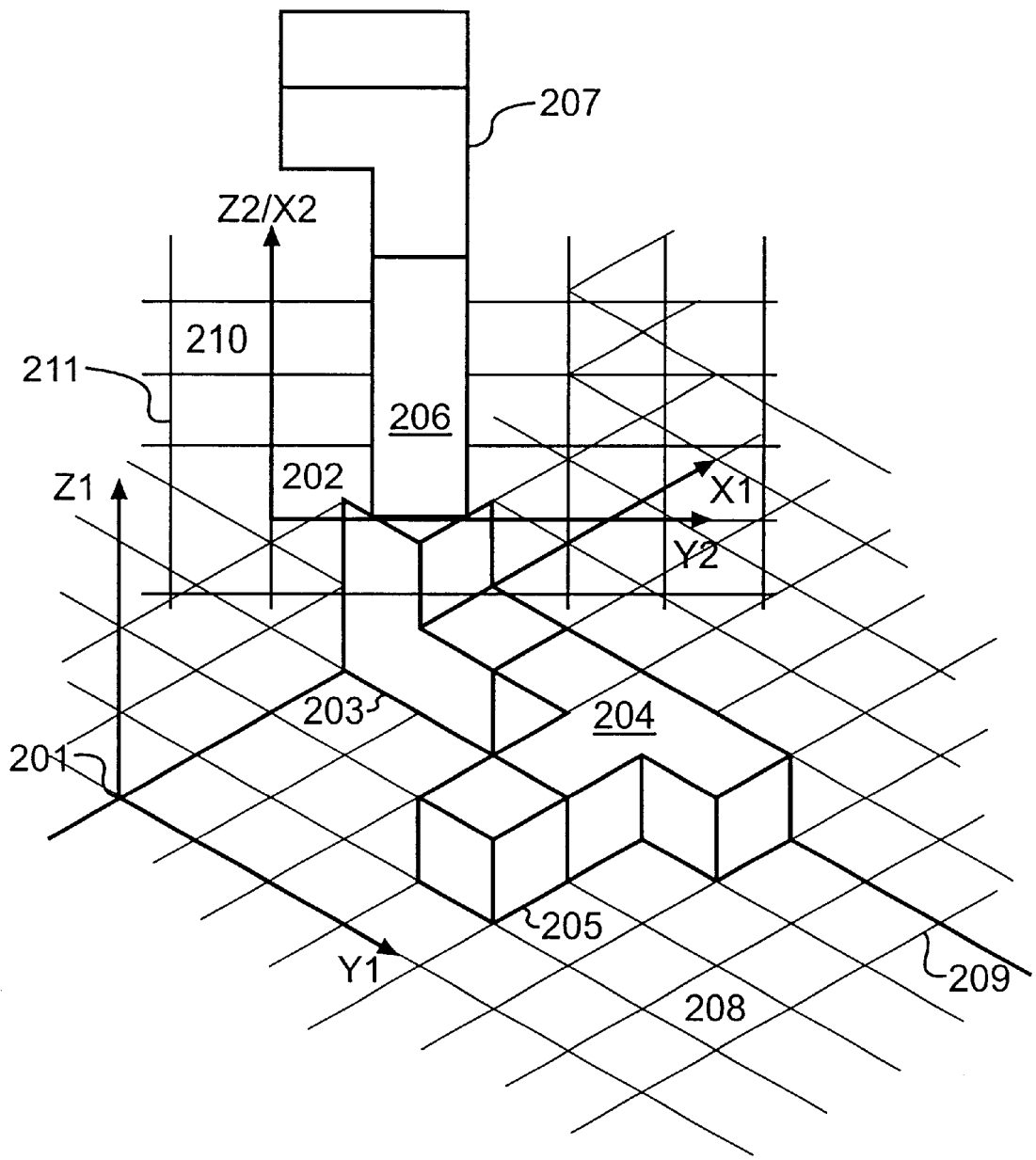
FIG. 2b shows a second object subject for modelling according to the invention.

FIG. 2b shows the simple object shown in FIG. 2a where the second segment is rotated relative to the first segment. In this illustration it is clear that there exist two different and non-coincident co-ordinate systems defined by the axis $x_1$, $y_1$, $z_1$, and $x_2$, $y_2$, $z_2$, respectively. Elements within the segment 201 can be placed only in accordance with the modules 208 of the grid 209. Correspondingly, elements within the segment 202 can be placed only in accordance with the modules 210 of the grid 211. The elements within a segment are thereby constrained with regard to their position. The grids are shown as two-dimensional grids but typically the grids will be three-dimensional grids allowing for arrangement of the elements in three dimensions. Further, the orientations of elements within a segment are constrained to rotations in 90-degree steps with respect to the three axes ($x_1$, $y_1$, $z_1$ and $x_2$, $y_2$, $z_2$, respectively) of the segments.

The segment 202 is placed in accordance with the grid 209 of the segment 201, but the segment 202 is allowed to rotate with respect to the axis $z_1$. The simple model is now expanded and it is possible to model advanced objects comprising a succession of rotatable segments. It should be noted that despite the fact that this rotation feature is introduced into the simple model, the representation is only extended with a single number representing the angle of the rotation because the position of the segment 202 is constrained to the grid 209 and because the elements 204 and 205 also are constrained to a grid, ie the grid 211.

By gradually adding more elements to the segments and interconnecting new segments having elements with the existing segments 201 and 202, it is possible to expand the model. In fact rather complex geometric objects can be modelled this way despite the heavy restrictions in the form of position and orientation constraints. These heavy constraints are the key to a very compact representation of a model modelling a complex geometric object.

In particular, a model according to the invention will be superior to prior art virtual reality models when an object subject to modelling comprises relatively few rigid parts that can move or rotate relative to each other and when the rigid parts must be modelled with many elements. An example of such an object can be e.g. a bridge having two bridge leafs. A model of this object may comprise only two moveable rigid parts, that is the bridge leafs, but the respective bridge leafs and platforms supporting the bridge leafs may comprise rigid structures, e.g. fences, pavement and towers that have to be modelled by means of many elements.

In the following there is provided a description of how the representation according to the invention is actually generated and how other features can be added to the model according to the invention.

Figure 3:
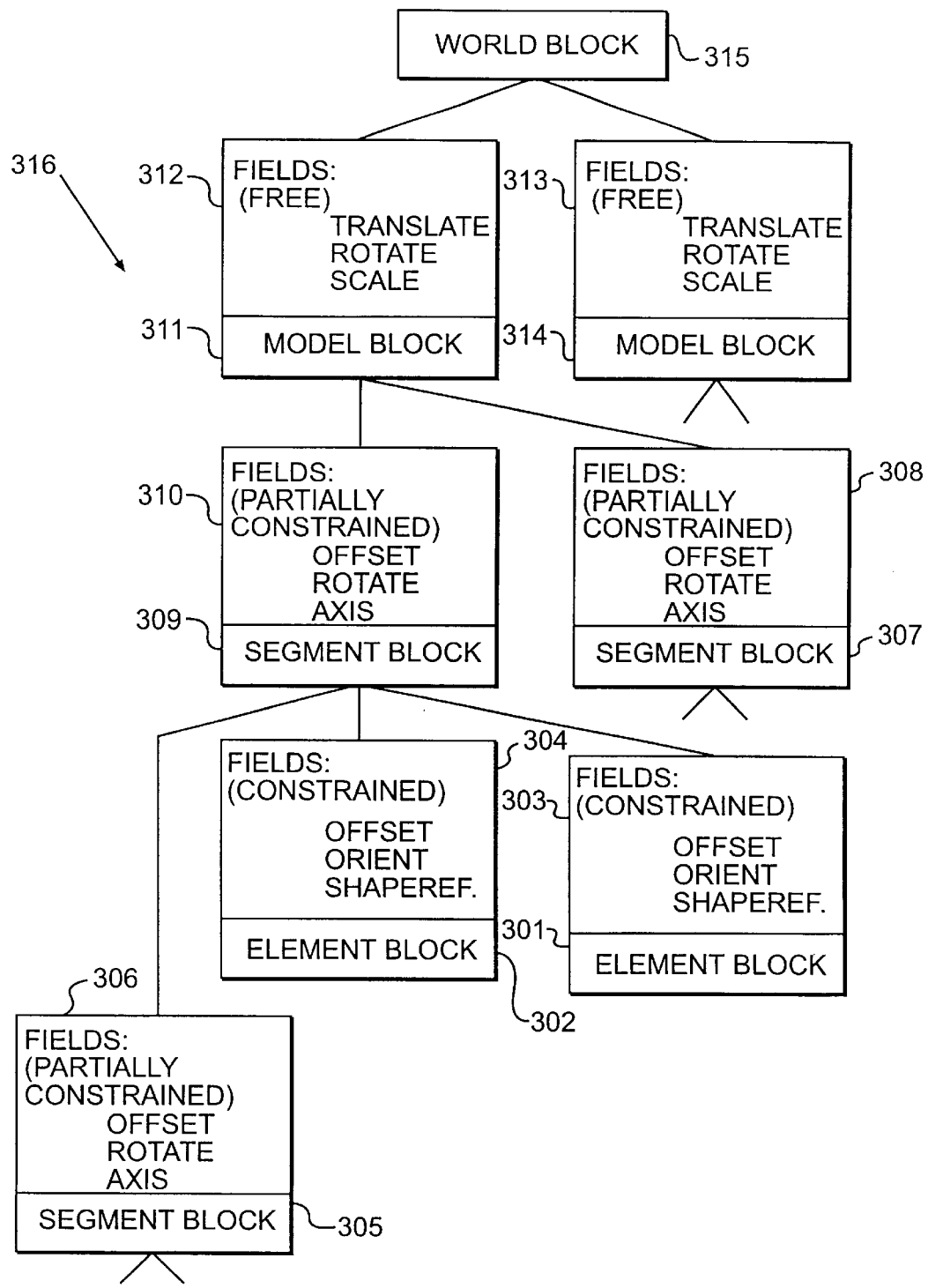
FIG. 3 shows the hierarchical structure of a model of a geometrical object according to the invention.

FIG. 3 shows the hierarchical structure of a model of a geometrical object according to the invention.

The object of the hierarchy is not just to provide logical groupings of geometrical primitives which may be subject to a common transformation, but also to add different types of constraints on parameters used in the respective levels of the hierarchy, thereby making it possible to select an expedient representation of the parameters in view of the constraints and in the sense of establishing a compact representation of the model, It should be noted that the hierarchy concerns the spatial relationship between elements—not the actual representation of geometrical shapes for the elements. The actual representation of the shape of elements can be selected to be in any convenient format e.g. VRML or 3DMF.

A model according to the invention can be organised by means of a hierarchy 316 comprising four basic levels: 'World Level', 'Model Level', 'Segment Level', and 'Element Level'.

On the World Level there is defined a World Block 315 representing a virtual world. The primary object of the World Block is to define a three dimensional space having an origin wherein the origin is a common reference for the lower layers of the hierarchy.

On the Model Level there can exist a number of Model Blocks 311, 314 representing models in the virtual world. Model Blocks comprise fields 312 and 313 and blocks in the form of Segment Blocks 309, 307. In a preferred embodiment the fields in the Model Block are 'Translate', 'Rotate', and 'Scale'. The fields define the position, orientation, and the size of the model in the virtual world. The position, orientation, and the size of the model are allowed to be defined freely, ie the model is not restricted by any constraints on the fields. In a computer the fields Translate, Rotate, and Scale can be represented by means of numbers of the type Real, ie a floating point representation.

On the Segment Level there can exist a number of Segment Blocks 307, 309 representing segments in a model. Segment Blocks comprise fields 308, 310 and blocks 301, 302 in the form of Element Blocks and/or subordinate Segment Blocks 305. The fields 310 in the Segment Block are Offset, Rotate, and Axis. The fields define the position of an axis within the segment, rotation in terms of an angle about the axis, and the orientation of the axis. The position of the axis thereby defines a connection used to connect the segment Block 305 to a subordinate Segment Block 305.

The position of the axis within the segment is restricted to positions allowed by the constraints of the segment. Such constraints can be set up by means of a three-dimensional system of co-ordinates wherein elements can be positioned in modular steps. The angular rotation around the axis is not constrained in a basic embodiment of the invention. The orientation of the axis is constrained to 90 degree steps about three orthogonal axis of the system of co-ordinates see e.g. FIG. 2b.

The field Offset can have three parameters represented by means of numbers of the type Integer in a computer. Alternatively, a field translate having three parameters of the type Integer can be used.

Further, the field Rotate can have three parameters comprising an array of three numbers of the type Real, and Axis can be represented by means of an array of three numbers of the type Short Integer or, alternatively, just be represented by indicating one of three axes in the system of co-ordinates by means of single bits.

On the Element Level there can exist a number of Element Blocks 301, 302 representing elements within a segment. Element Blocks do not comprise any subordinate blocks but only fields 303, 304. Thus element blocks terminates the hierarchy downwards. The fields in the Element Block are Offset, Orientation, and Shape Reference. Regarding position and orientation elements are the most restricted parts of a model. The field Offset is a three-dimensional offset constrained to discrete values. Preferably, if the constraints are set up by means of a three-dimensional system of co-ordinates wherein elements can be positioned in modular steps, the field Offset can be represented by means of an array of numbers of the type Integer. Further, the field Orientation is constrained in the same manner as the field Axis in the Segment Blocks, ie constraint to 90 degree steps about three orthogonal axis of the system of co-ordinates. Thus, Axis can be represented by means of an array of three numbers of the type Short Integer or alternatively, just be represented by indicating one of three axes in the system of co-ordinate.

By means of the field Shape Reference elements include a reference to a geometric description which may be interpreted and used for visualization purposes. The shape reference is preferably a reference number that can be used in a query to a database comprising a geometric description of the individual elements. Typically, a model will be based on a set of different types of elements. The database comprises a geometric description of the individual elements according to any preferred geometric description. Preferred geometric descriptions can be VRML, 3DMF, etc. Further, in the database there can be stored a number of different types of geometric descriptions for each element. It is thereby possible to select a geometric description which may be suitable in some sense, e.g. in the sense of providing a good trade-off between obtaining a reasonably fast visualisation of the model and obtaining a sufficiently high resolution of the visualisation. It should be stressed that only the position of the elements are constrained to integer co-ordinates—not the co-ordinates or other types of parameters used for representing the shapes of the elements.

The Element Blocks 301, 302 can also comprise other fields providing a reference to a material that the element is made of, a reference to a decoration or texture. Such fields may be denoted 'Material Reference' and 'Decoration Version'. As for the geometric description, a description of materials and decoration or texture may be stored in a database in a suitable format.

Thus, the impact of constraining a model structure according to the invention compared to e.g. the VRML model structure is based on the fact that in most modelling tasks the structures on the lowest level of the hierarchy is used most frequent. Thereby, by constraining exactly these lowest level structures and adapting a representation of these structures to be only just sufficient it is possible to obtain a very compact model representation. When the hierarchy is considered as a hole, the Model Block allows for a free transformation, the Model Block allows for a partial constrained transformation, while the Element Block only allows for a very constrained transformation.

Having defined a possible geometrical interpretation of elements and segments and having defined a hierarchy wherein elements, segments, models, and worlds are organised, the topic is now to define a preferred embodiment of a corresponding code-structure which is used to represent an actual model.

Code-structure

The code-structure comprises two types of primitives: blocks and fields. A block is defined by a block name and braces { } enclosing its contents. A block can enclose a number of fields and other subordinate blocks. A field is defined by a field name and a number of parameters succeeding the field name.

Blocks and Fields

In the following blocks are written with their block name followed by their context in parenthesis. Context is the block in which they can exist; the top level is referred to as File. The term File is used as a reference to e.g. an electronic file stored on a computer readable medium e.g. in the memory of a computer, on a CD-ROM, on a Digital Video Disc (DVD), on a floppy disc, on a hard-disc, in volatile memory (e.g. Random Access Memory) etc.

Each block has a short description. In order to reduce the complexity of this definition subordinate blocks are written with their block name only.

World(File)

The structurally important primitives are the blocks in the hierarchy, ie World Block, Model Block, Segment Block, and Element Block. The World Block refers to a file 'File' containing a description of the world.

The world is defined by the following syntax

```
World
{
   Options{ ... }
   Model{ ... }
}
```

In a virtual world according to the invention there can exist a number of models contained in the statement 'Model{ ... }'. However, it is possible to set up other features in the world which may or may not be described according to the invention. Such features can be background, sound, predefined events, etc.

Otherwise the world Block is used for setting up a common reference for the models (and other features) in the world. Preferably, this reference is in the form of a system of co-ordinates.

Model(World)

The Model Block can contain a number of models or a number of Segment Blocks. The fields in Model Blocks are: 'Rotate', 'Translate', and 'Scale'.

```
Model
{
   Rotate[Real; Real; Real]
   Translate[Real; Real; Real]
   Scale[Real; Real; Real]
   Segment{ ... }
}
```

It should be mentioned that all rotate and orientation parameters are based on the well-known right-handed system of co-ordinates that is, the thumb follows positive values of one of the axes and positive angle values are counted in the direction of the other fingers.

The Rotate field comprises three parameters determining how the model shall be orientated in the World. Preferably, the parameters are specified as well-known Euler-angles, ie firstly the model is rotated according to a first of the three parameters specifying an angle about a first axis in a rectangular system of co-ordinates, secondly the model is rotated according to the second parameter specifying an angle about a second axis which orientation is changed due to the first rotation of the model around the first axis. This procedure is followed until the model has been rotated as desired by the three parameters in the Rotate field. However, other procedures for specifying the orientation and/or rotation of an object can be applied.

In the syntax for the Rotate field in the above definition of a Model, the parameters are of the type 'Real', however, other types can be used, e.g. Integers, a given enumerated type e.g. comprising the possible values [0, 10, 20, ..., 350] degrees, or other types.

The field Translate also comprises three parameters of the type Real. Each of these parameters specifies a translation of the model along one of three orthogonal axes in a system of co-ordinates. Thus Translate allows for translations which are not restricted to the modules of the modular system of co-ordinates.

Segment(Model, Segment)

The Segment Block contains a body part formed by Element Blocks and, optionally, subordinate segment Blocks. The fields in Segment are 'Offset', 'Orientation', 'Axis', and 'Rotate'.

```
Segment
{
   Offset[Integer; Integer; Integer];
   Orientation[2 bit; 2 bit; 2 bit];
   Axis [3 bit];
   Rotate[Real];
   Element{ ... }
   Segment{ ... }
}=ps
```

The Offset field describes the position of an origin of the current segment with respect to the origin of another segment which—in the hierarchy—is superior to the current segment. If no superior segment exists, the Offset field is omitted. The Offset field comprises three parameters of the type Integers for describing the position. By constraining this position to integer values a significant reduction in the amount of data required to represent a complete model is obtained.

The Orientation field (omitted in FIG. 3) describes the orientation of the segment ie whether the segment is e.g. orientated upside-down, turned 90 degrees to the left etc. The Orientation field comprises three two-bit parameters for describing this orientation in 90-degrees step about one or more of the three axis in the system of co-ordinates.

The Axis field describes the orientation of an axis about which the segment can be rotated. Only a three-bit parameter is used for specifying one of the three axis in the system of co-ordinates because the orientation is described relatively to the origin of the current segment.

The Rotate field describes a rotation of the current segment about the previously defined axis defined in the Axis field. The Rotate field comprises a single parameter of the type Real. This parameter can be used to specify a static angle of the current segment or the parameter can be modified to simulate a manipulation e.g. in the form of a rotation of the current segment with a specified angular velocity.

Thus, by the above defined constraints a significant reduction in the amount of data required to represent a complete model is achieved. This benefit is achieved without dissatisfying a user creating a model according to the invention because constraints are expected in a modular building system or modular virtual reality. However, if the constraints are a limiting factor in a part of a modelling task e.g. a Translate field as defined in the Model block can be applied to overcome or unbound the constraints. Ie a displacement using non-integer numbers e.g. of the type Real can be used.

The statements 'Element{ ... }' and 'Segment{ ... }' indicate that the segment in question can comprise subordinate elements and segments according to the hierarchy of a model according to the invention.

Element(Segment)

The Element Block is the geometric primitive according to the invention. It refers to a geometrical body by means of the field 'ShapeReference'. However, other reference fields can be defined: 'MaterialReference' and 'DecorationVersion'. Other fields are: 'Orientation' and 'Offset'.

```
Element
{
   Offset[Integer; Integer; Integer];
   Orientation[2 bit; 2 bit; 2 bit];
   ShapeReference[Integer];
   MaterialReference[Integer];
```

DecorationReference[Integer];
}

The Offset field is used to define a position of the element within a segment and according to the modules of the modular grid. Thus parameters of the type Integer can be used. Alternatively, parameters of a type comprising a string of alphanumeric characters can be used in the fields ShapeReference, MaterialReference, and DecorationReference.

The orientation of the element is defined by means of the Orientation field and three 2-bit parameters. Thus the orientation of the element is constrained to the modular grid of the segment.

In order to handle a specific model in an efficient manner the Element block comprises a reference to a geometrical description of the element instead of the entire geometrical description which may comprise a large amount of geometrical data. Thus the appearance of a model can be changed by interchanging a ShapeReference parameter in the element block with another ShapeReference parameter.
AdditionalAxes(Segment)

The AdditionalAxis Block (omitted in FIG. 3) is used in Segment Blocks to indicate closed geometrical loops. A segment is also allowed to rotate about an additional axis. The fields are 'AdditionalZero' and 'AdditionalAxis'. The position of the additional axis within the segment is defined by means of the Additional Zero field. The orientation of the axis is defined by means of the Additional Axis field.

AdditionalAxis
{
    AdditionalZero[Integer; Integer; Integer];
    AdditionalAxis [3 bit];
}

The definition of the fields AdditionalZero and AdditionalAxis corresponds to the previous definitions of Offset and Axis.

Turning now to an example of a specific model according to the invention.

Figure 4:
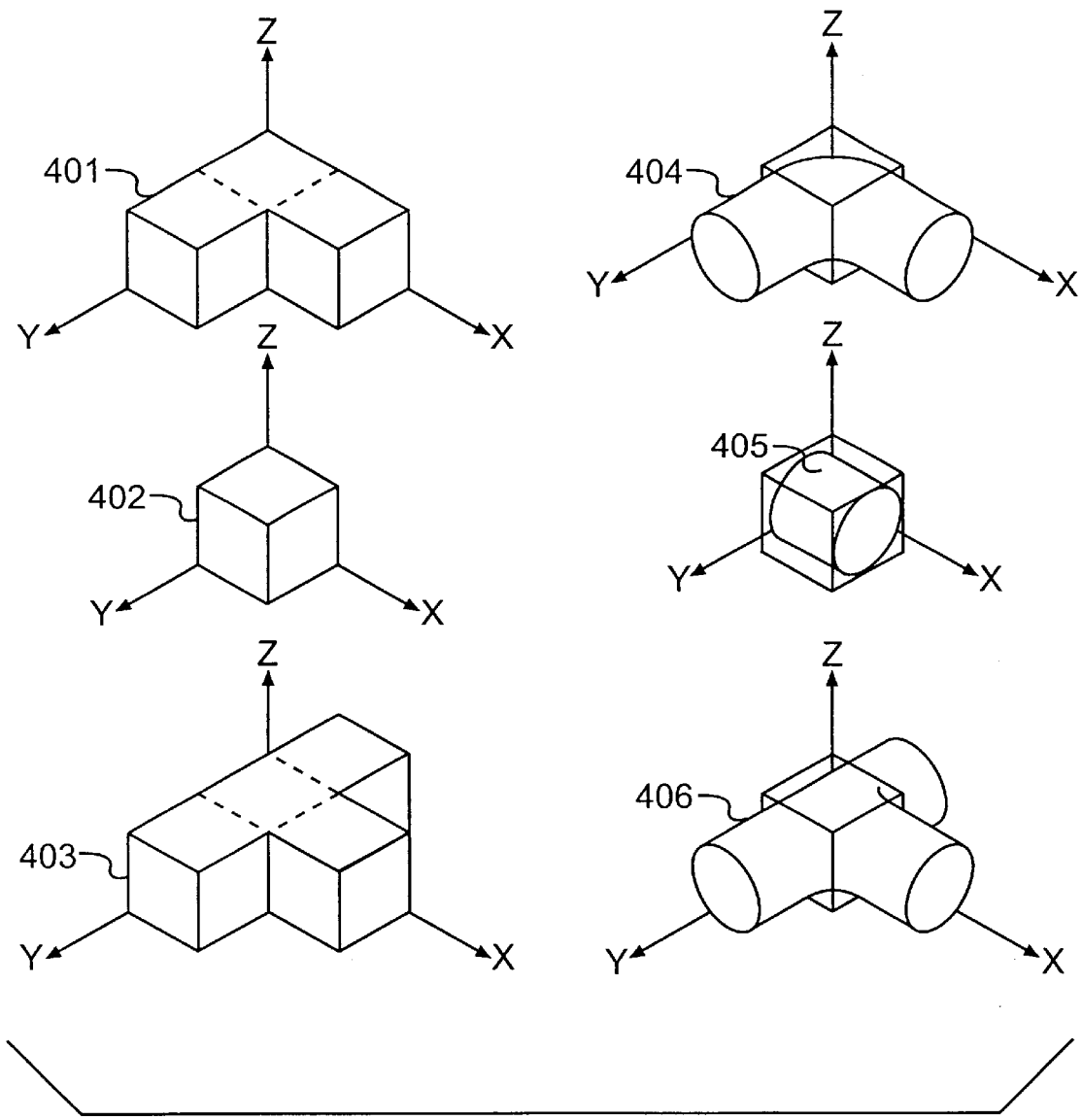
FIG. 4 shows two families of elements.

FIG. 4 shows two families of elements. A first family comprising the elements 401, 402, and 403. A second family comprising the elements 404, 405, and 406. Each of the elements has a geometrical description which is associated with a reference such that the geometrical description can be retrieved when an element having a specified reference is requested. The geometrical description can be provided by designing the elements by means of computer aided design software thereby generating data in a specified format which can be stored on and retrieved from an expedient medium. Such a specified format can be e.g. VRML, 3DMF etc. Thus the data can be retrieved for visually interpreting a virtual model according to the invention.

Each of the elements is designed having a reference position and orientation such that when the elements are used in a model, their position and orientation in the model can be described relative to the reference position and orientation. In order to define this reference position and orientation the elements are for illustration purposes, in this disclosure only placed in a orthogonal system of co-ordinates having axes X, Y, and Z.

Despite the different appearances of the individual elements, each of the elements has a respective reference module corresponding to a module in the modular grid of a segment. This reference module is indicated with dotted lines/a surrounding box.

Turning now to the specific elements. The element 401 is a L-shaped element occupying three grid modules. This element is assigned the type identification 'T401'. The element 402 is a cubic element occupying a single grid unit. This element is assigned the type identification 'T402'. The element 403 is a T-shaped element occupying four grid units. This element is assigned the type identification 'T403'.

Correspondingly, the element 404 is a L-shaped tube element occupying three grid modules. This element is assigned the type identification 'T404'. The element 405 is a straight tube element occupying a single grid unit. This element is assigned the type identification 'T405'. The element 406 is a T-shaped tube element occupying four grid modules. This element is assigned the type identification 'T406'.

Thus it is then possible to store a geometrical description for each of the elements 401–406 and retrieve a geometrical description for a specified element from the virtual modelling language according to the invention by means of the type identification ie a reference.

Preferably, the elements in the respective families are designed such that they can be interconnected with other elements in their respective families. This may be indicated visually by designing the elements such that they comprise a recognisable interface in the form of a surface which is coincident with a plane between two neighbouring grid modules. Considering the tube-shaped elements 404, 405, and 406 a recognisable interface can be in the form of the ends of the tubes. Other elements are shown in e.g. U.S. Pat. Nos. 4,214,403; 4,176,493; 5,795,210; 4,124,949; 5,645,463.

Figure 5:
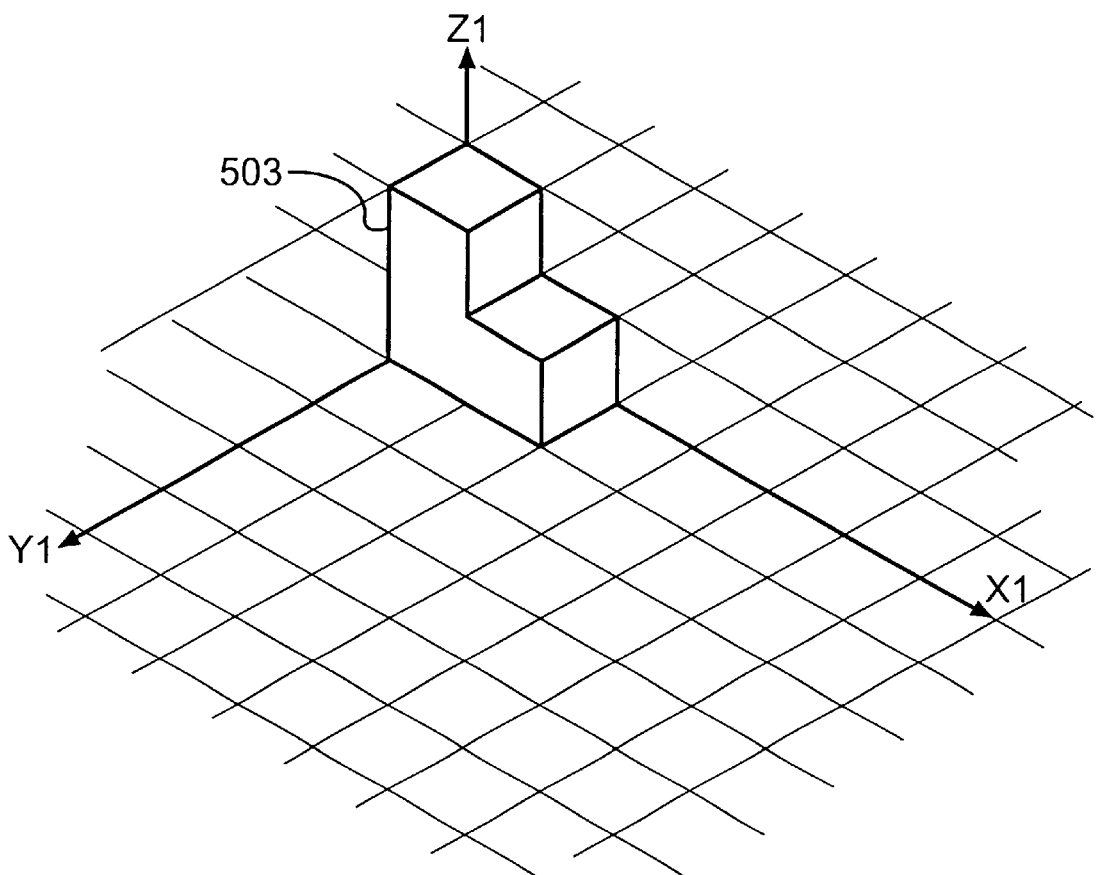
FIG. 5 shows a first step in a process of building a model of a third geometrical object.

FIG. 5 shows a first step in a process of building a model of a geometrical object. The element 501 of the type 'T401' is arranged in a segment having an orthogonal system of co-ordinates defined by the axes X1, Y1, and Z1. The axes are for illustration purposes only and may or may not be shown if and when the model is subject for visualisation.

In a preferred embodiment of the virtual reality model it is defined that the smallest possible model shall comprise at least one segment, therefore the element 501 is arranged in a segment. It is noted that the element 501 has an orientation with respect to the axes X1, Y1, and Z1 which is different from the reference orientation in the definition of the type of the element, see FIG. 4. This orientation is preferably described as a multiplicity of 90 degrees steps of the element. The element 501 is orientated by rotating the element 270 degrees about an axis parallel to the X1-axis, where angles are measured according to a right-handed system of co-ordinates (ie letting the thumb follow the x-axis and taking positive values in a circular direction following the fingers—this definition will be used through out the following).

The preferred code used to represent the segment having a single element 501 is given below:

CODE BEGIN:

Segment
{
    Element
    {
        ShapeReference(T401);
        Orientation(270, 0, 0);
    }
}

CODE END.

According to the definition of the code syntax, a segment having an element is defined. Further, by means of the Shape Reference field it is defined that the type of the element is 'T401'. The orientation of the element is stated by means of the Orientation field and the parameters (270, 0, 0) stating that the element is rotated 270 degrees with respect to the X1-axis. It should be noted that the parameters in this example are stated as degrees, however due to the 90 degree constraint this representation can be coded into only two bits per parameter.

Thus this code can be interpreted by a visual interpreter application loading a geometrical description of the element, calculating the position and orientation of the element in accordance with the statement given in the code above, and calculating a desired projection onto a plane or sphere for displaying by displaying means.

The size of the grid is selected to be relatively coarse compared to the resolution used for displaying the element. Typically, the size of the grid is adapted to be capable of only just handling interconnection or simply to allow for alignment in some sense of elements within a family of elements.

Despite the fact that the elements are positioned in a system of co-ordinates by means of integer co-ordinates, the definition or representation of the geometrical shapes of the elements can comprise non-integer co-ordinates. The important aspect is that the position of the elements are represented by means of integers.

Figure 6:
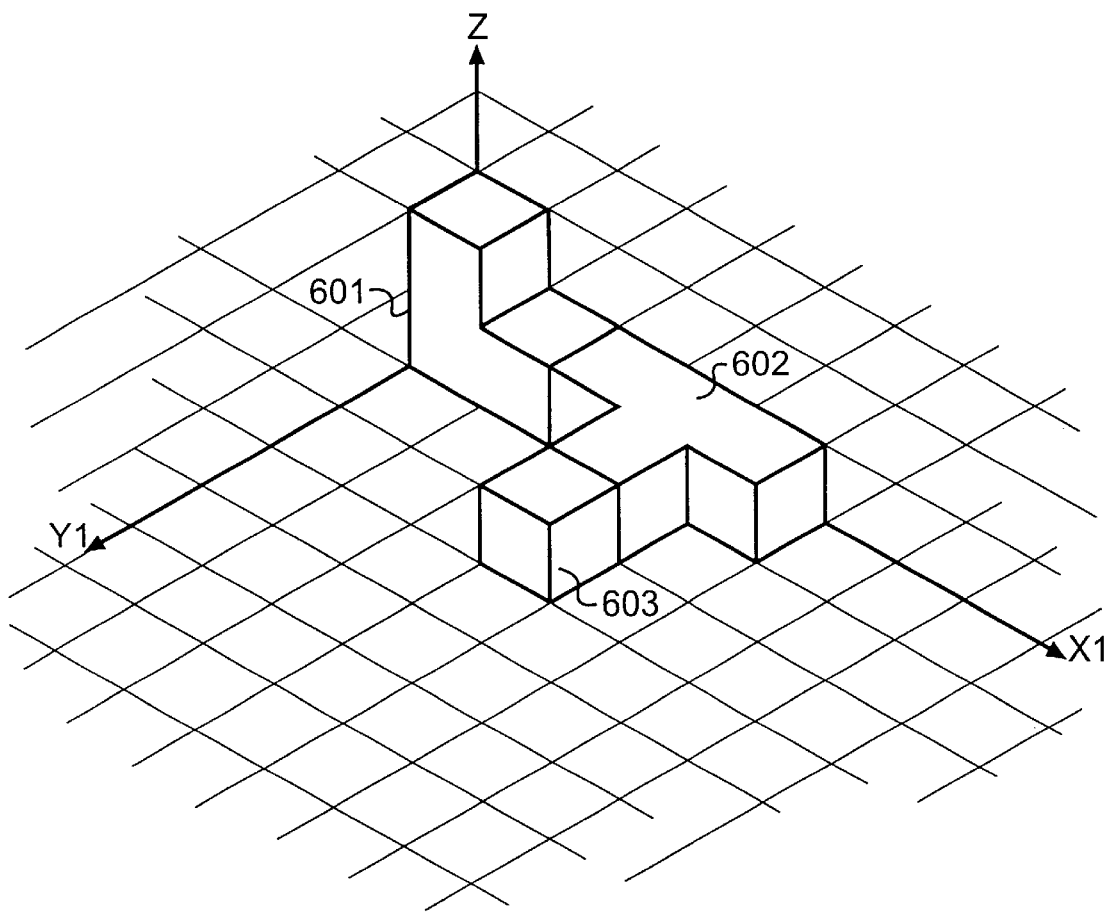
FIG. 6 shows a second step in a process of building a model of the third geometrical object.

FIG. 6 shows a second step in a process of building a model of a geometrical object. In this step more elements are added and the impact of the virtual model according to the invention will appear more clearly. Now the geometrical object comprises three elements 601, 602, and 603 of the respective types 'T401', 'T403', and 'T402'. The position and orientation of the respective elements are given by means of the following code:

CODE BEGIN:

```
Segment
{
  Element
  [
    ShapeReference(T401);
    Orientation(270, 0, 0);
  }

Element
  {
    ShapeReference(T403);
    Orientation(0, 0, 270);
    Offset(3, 0, 0);
  }

Element
  {
    ShapeReference(T402);
    Offset(3, 2, 0);
  }
}
```

CODE END.

The first part of the code defining the element 601 is already introduced. As will appear, the other elements (602 and 603) in the segment are defined relative to this element (601).

The next part of the code defines the element 602 of the type 'T403'. As is seen, this element has not the same orientation as in the definition of the type of the element; therefore it is necessary to add an orientation field specifying that the element is rotated 270 degrees about the Z1-axis. Further, the element 602 is displaced an integer offset value of three modules along the X1-axis.

The last part of the code defines the position of the element 603 of the type 'T402'. This element is displaced an integer offset value of three modules along the X1-axis and an integer offset value of two along the Y1-axis.

Because elements within a segment can be placed only in accordance with the modules of the grid, parameters used for defining position and orientation of the elements can be represented very efficiently, e.g. by means of integer values.

In this way, further elements may be added to the segment if desired.

In case of manipulation, it is easily determined that elements within the segment cannot be manipulated relatively to each other due to the constraints given by the modular grid.

Figure 7:
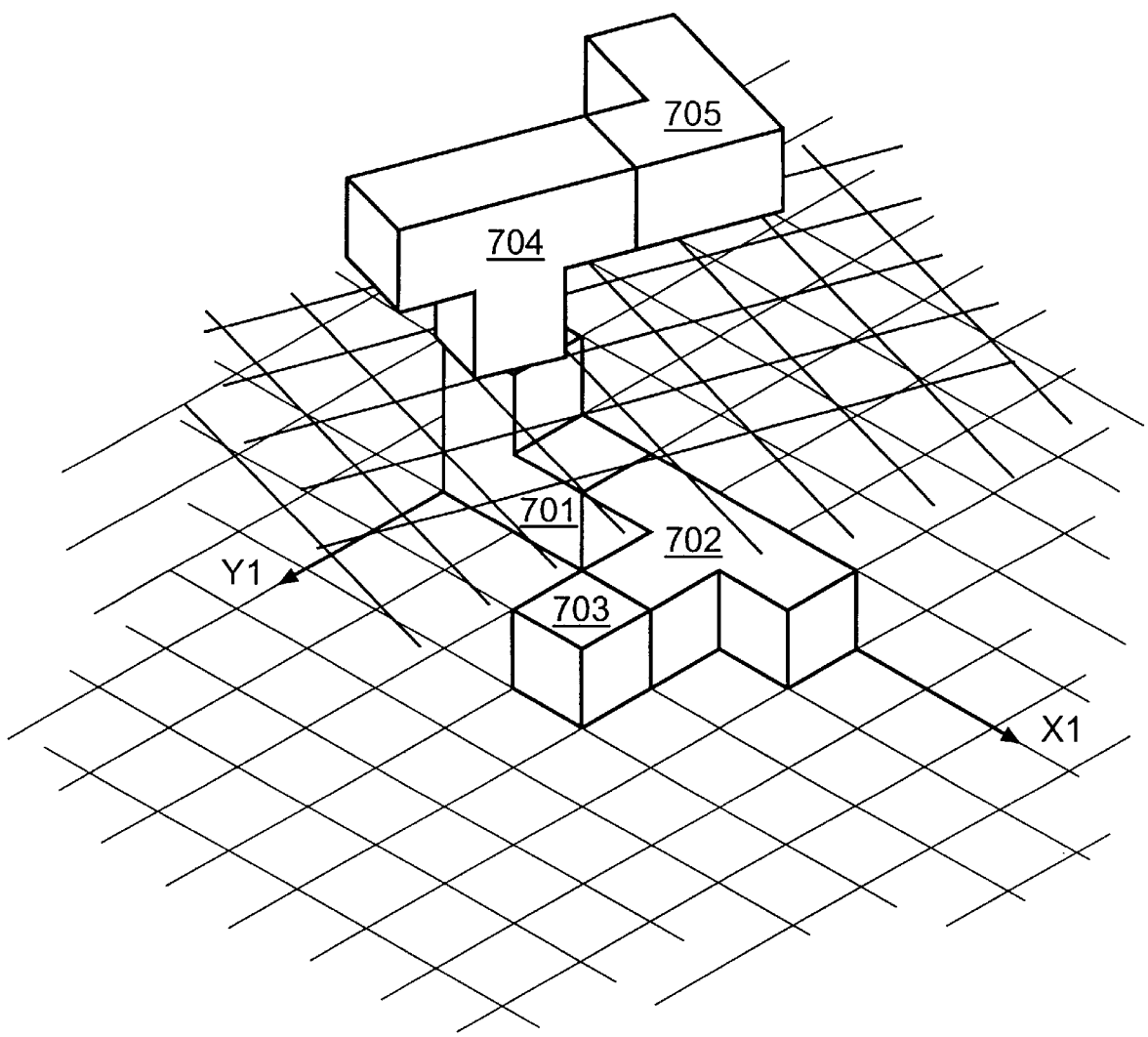
FIG. 7 shows a third step in a process of building a model of the third geometrical object.

FIG. 7 shows a second step in a process of building a model of a geometrical object, according to the invention. In this step still more elements are appended to the model and the impact of the virtual model according to the invention will appear even more clearly. Further, in this step elements are added, that are not necessarily bound to the position and orientation constraints given within a segment. This requires an extended description of the model, however due to the fact that this extended description is only used where it is needed (ie in describing e.g. rotations) the compactness and expediency of the overall model is maintained.

Now the geometrical object comprises five elements 701, 702, 703, 704, and 705 of the respective types 'T401', 'T403', 'T402', 'T403', and 'T401'.

The position and orientation of the respective elements are given by means of the following code:

CODE BEGIN:

```
Segment
{
  Element
  {
    ShapeReference(T401);
    Orientation(270, 0, 0);
  }
  Element
  {
    ShapeReference(T403);
    Orientation(0, 0, 270);
    Offset(3, 0, 0);
  }
  Element
  {
    ShapeReference (T402);
    Offset(3, 2, 0);
  }

Segment
  {
    Offset(0, 0, 2);
    Orientation(90, 0, 0);
    Rotate(225);
    Axis (0, 0, 1);
    Element
    {
```

```
      ShapeReference(T403);
      Offset(0, -1, 0);
    }
    Element
    {
      ShapeReference(T401);
      Offset(-3, -1, 0);
      Orientation(270, 0, 0);
    }
  }
}
```

CODE END.

The first part of the code defines the elements 701, 702, and 703 introduced in FIG. 6. The next part of the code defines a further segment being rotated 45 degrees with respect to an axis parallel to the Z-axis (ie the vertical axis) and having elements 704 and 705.

The part of the code, defining the elements 704 and 705, can be generated in different ways, however the following step-by-step procedure comprising steps 1–4 is considered to be the easiest to understand.

Step 1

In this step of the code generation it is determined (e.g. in response to a users command) that a new segment shall be added to the model. With this in mind, the element 704 is added as the first element in the new segment having a modular grid (not shown) coincident with the grid or co-ordinate system as defined in the definition of the element (See FIG. 4) of the type 'T403'. Thus no Offset or Orientation fields need to be specified. Succeeding, the element 705 is added to the new segment. However, this element is offset by an integer value of –3 along the X1-axis and the orientation is rotated 270 degrees about the X-axis relative to the orientation of the element in the definition of the element of the type 'T401'. This is defined by the Offset and orientation fields in the following code:

CODE BEGIN:

```
Segment
{
  Element
  {
    ShapeReference(T403);
  }
  Element
  {
    ShapeReference(T401);
    Offset(-3, 0, 0);
    Orientation(270, 0, 0);
  }
}
```

CODE END.

Step 2

In this step of the code generation, the origin of the new segment is determined to be located where the new segment is connected to the old segment, ie at the bottom of the 'T-shaped' element 704. Therefore the positions of the elements 704 and 705 is re-calculated to be in accordance with this new origin in the segment.

CODE BEGIN.

```
Segment
{
  Element
  {
    ShapeReference(T403);
    Offset(0, -1, 0); //added
  }
  Element
  {
    ShapeReference(T401);
    Offset(-3, -1, 0); //modified
    Orientation(270, 0, 0);
  }
}
```

CODE END.

It is noted this involves that an Offset field is added for the element 704 and that the Offset field for the element 705 is modified to reflect this new origin.

This re-calculation must also be carried out if the new segment is connected to the old segment at a different position in the new segment e.g. as shown in FIG. 2b. But since the Offset parameters are of the type Integers this re-calculation can be carried out very fast compared to a situation where parameters of the type Real were used. Despite the fact that many add and subtract operations will be executed in a practical model no round-off errors will be introduced due to the integer representation.

Step 3

In this step of the code generation, it is specified where the new segment shall be interconnected with the old segment. This is stated by specifying how the origin of the new segment is translated relative to the origin of the old segment. This is done by inserting the following Offset field into second segment block the code given in step 2 above.

Offset(0, 0, 2);

Thus the origin of the new segment is translated an integer value of two along the Z1-axis.

Step 4

Having defined the position of the new segment and the elements within the new segment, the orientation of the new segment relative to the old segment can be specified. This is done by inserting the following 'Rotate' field into the code given in step 2 above.

Rotate(90, 225, 0);

Thus, firstly, the new segment is rotated 90 degrees about the X-axis and then, secondly, the segment is rotated 225 degrees about the Y-axis already rotated 90 degrees as defined previously.

In case of manipulation it is, as previously stated, easily determined that elements within the segments cannot be manipulated relative to each other due to the constraints given by the modular grid. But it is also easily determined that the segments are allowed to rotate relative to each other due to the implicit definition of the segments. Thus no additional meta-description ie a definition of possible manipulations (ie movements or rotations) needs to be defined. If it is desired to translate the segments relative to each other and without being constrained by the respective modular grids, a simple Translate field can be added, defining the translation.

Figure 8:
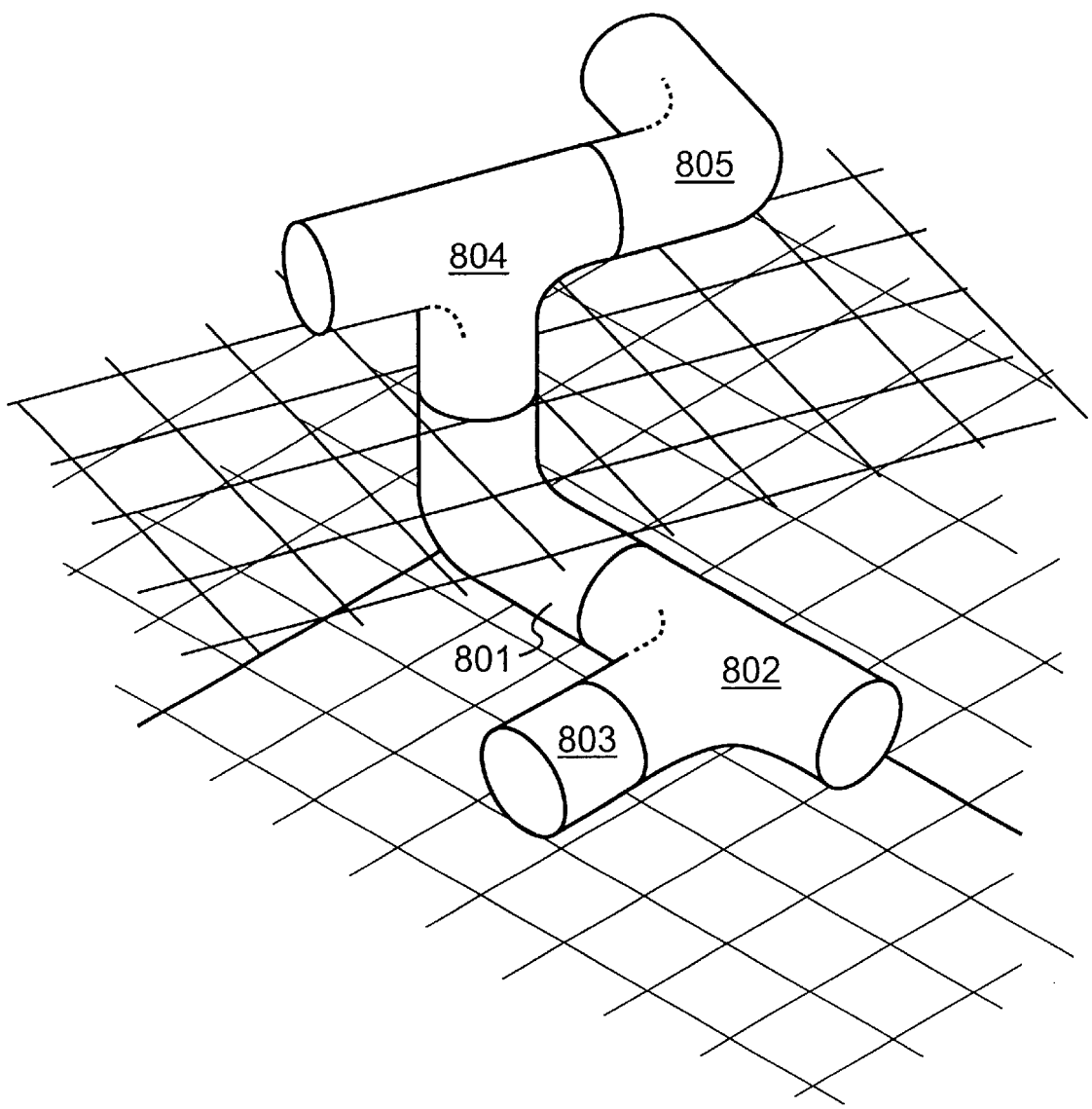
FIG. 8 shows a fourth object to be modelled, according to the invention.

FIG. 8 shows a third simple object to be modelled, according to the invention. This object can be described with the same model as described for FIG. 7 above, only with the type of the respective elements defined by means of the 'ShapeReference' field parameters interchanged with the respective types of elements of the second family of elements defined in FIG. 4. The model comprises elements 801, 802, 803, 804, and 805 corresponding to the elements 701, 702, 703, 704, and 705 in FIG. 7, respectively.

Thus it is illustrated that another family of elements can be used in the model without loss of the efficient description. In a preferred embodiment the family of elements is adapted to a class of modelling paradigms such that the elements represent well-known real world objects which may be found to be feasible for a given modelling task.

Further, according to the above disclosure of a preferred embodiment and according to an object of the invention, it is evident for a person skilled in the art that a meta-description ie a description of possible manipulations of a geometrical object is given implicitly by means of the geometrical description, by modifying the parameters of the respective statements. Consider e.g. the interconnection of two segments, such interconnection is given by means of an Axis field and an Rotate field. By modifying the angle of rotation the geometrical description is changed while the manipulation ie rotation takes place. In such a case the axis of the rotation is defined in the geometrical description, so, in this way the meta-description is embedded in the geometrical description. When it comes to elements within a segment it is evident that these elements can not be subjected to a rotation since no parameters in the geometrical description allows for a meta-description of rotation. However, in a practical embodiment a user is provided with controls for applying new meta-descriptions if needed. In fact such new meta-descriptions are easy to apply since only a limited set of descriptions exists in the model structure and since the parameters are constrained to limited set of values.

Having defined the structure of models according to the invention, modifications, and manipulations of the models, a computer system for executing these tasks shall be disclosed.

Figure 9:
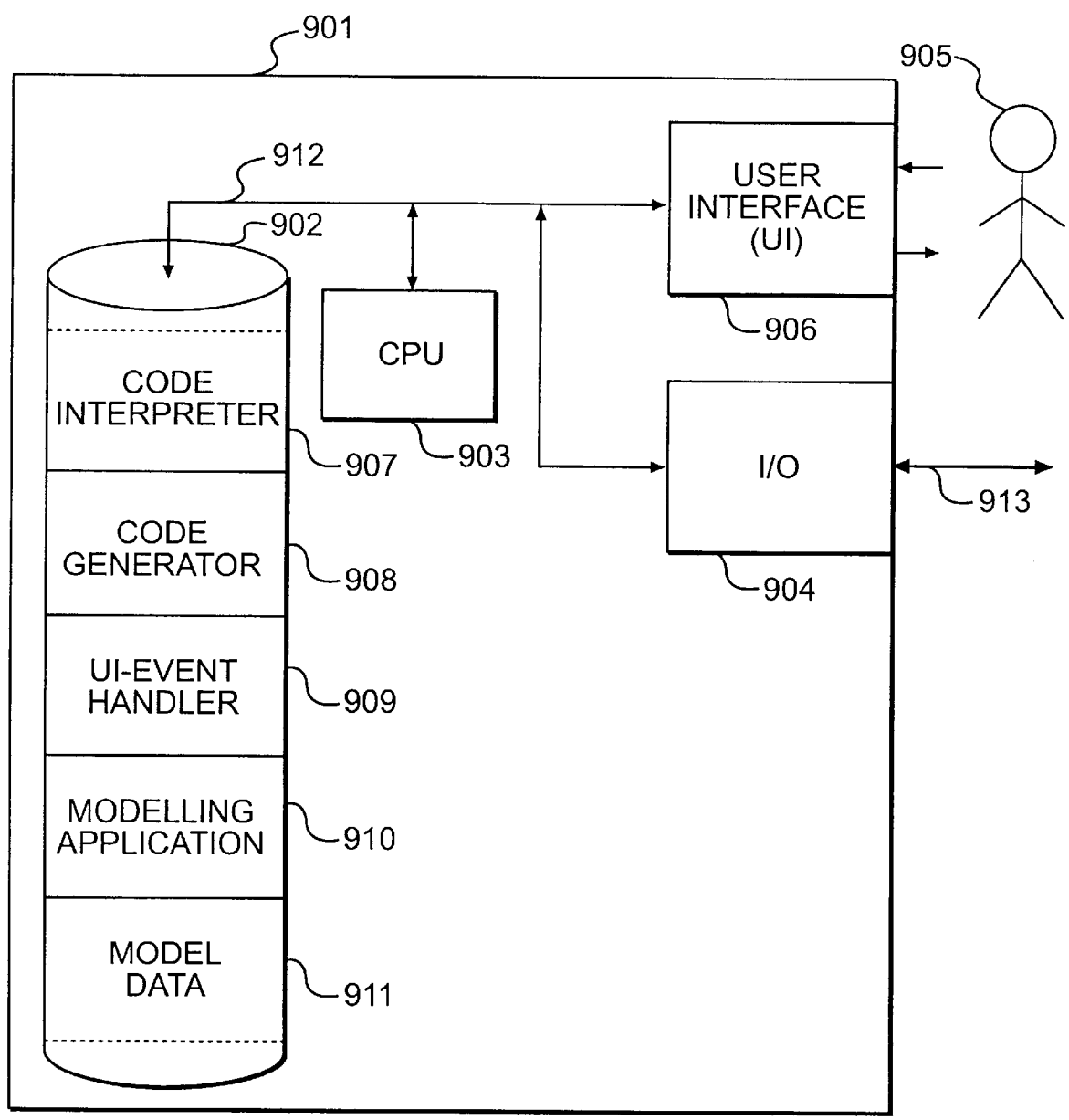
FIG. 9 shows a client computer system for designing, storing, manipulating, and sharing geometrical models according to the invention.

FIG. 9 shows a client computer system for designing, storing, manipulating, and sharing geometrical constructions according to the invention. The client computer system generally designated 901 can be used as a stand alone system or as a client in a client/server system. The client comprises memory 902 partly implemented as a volatile and a non-volatile memory means e.g. a hard-disc and a random access memory (RAM). The memory comprises procedures or programs Code Interpreter 901, Code Generator 908, UI-Event Handler 909, and Modelling Application 910 executable by the central processing unit 903. Further, the memory comprises Model Data'911.

The Code Interpreter 907 is adapted to read and interpret the code defining a model according to the invention. In a preferred embodiment the Code Interpreter is adapted to read a model according to the invention and to convert such a model into a known graphic format for presentation on a computer display. When the previously defined code structure for representing a model of an object is known to a person skilled in the art this conversion can be implemented by applying well-known graphical principles known within the field of graphical computing. A non-exhaustive list of functions implemented by the Code Interpreter 907 is given below:

Function 1
When a World Block is read, the Code interpreter (CI) will set up a system of co-ordinates with respect to which subsequent statements will refer.

Function 2
When a Model Block is read, the CI will prepare to place a Model comprising Segments and Elements within the system of co-ordinates defined by function 1. This is done according to the Rotate and Translate fields.

Function 3
When a segment Block is read, the CI will prepare to place a Segment comprising Elements according to the position and orientation specified in function 2 and according to an orientation field specifying the orientation of the segment. Additionally, the Offset, Axis, and Rotate fields are read for determining the position of sub-ordinary segments.

Function 4
When an Element Block is read the CI will read a geometrical description of an element specified by an element type reference in a Shape Reference field by accessing a database e.g. stored as the Model Data 911.

The result of the functions 1, 2, 3, and 4 invoked sequentially and/or iteratively is provided as data projected onto a plane or sphere or as data which can be subjected to a projection.

The UI-Event Handler 909 is adapted to convert a user's interaction with a user interface into proper user commands recognisable by the Code Generator 908. A set of possible and recognisable commands can comprise: Getting an element from a library of elements, connecting an element to another element, disconnecting an element, discarding an element, manipulating a segment e.g. initiating a rotation, etc. Along with each command there is associated a set of respective parameters as defined previously for each of the fields.

The Code Generator 908 is adapted to modify the code describing an actual model according to the invention as described above and in response to a user's commands. A non-exhaustive list of functions implemented by the Code Generator 908 is given below: (it is assumed that a segment is specified previously)

Function 5
When an element is selected from a library of elements, its type is specified by a Shape Reference field.

Function 6
When the element is connected to an element Within a segment, the segment is identified and the position and the orientation of the connected element within the segment is determined and represented by means of Offset and Orientation fields that are inserted into the representation of the model.

Function 7
When an element disconnected, the code representing the position and orientation of the element is deleted.

As a concurrent or subsequent task, the Code Interpreter can be executed for presenting tho result of the Code Generator.

The Modelling Application 910 is adapted to control memory, files, the user interface, etc.

A user 905 is capable of interacting with the client computer system 901 by means of the user interface 906.

In order to load models, geometrical descriptions, or other data, the client computer system comprises an input/output unit (I/O) 904. The input/output unit can be used as an interface to different types of storage mediums and different types of computer networks, e.g. the Internet. Further, the input/output unit (I/O) 904 can be used for exchanging models with other users e.g. interactively.

Data exchange between the memory 902, the central processing unit (CPU) 903, the user interface (UI) 906, and the input/output unit 904 is accomplished by means of the data bus 912.

Figure 10:
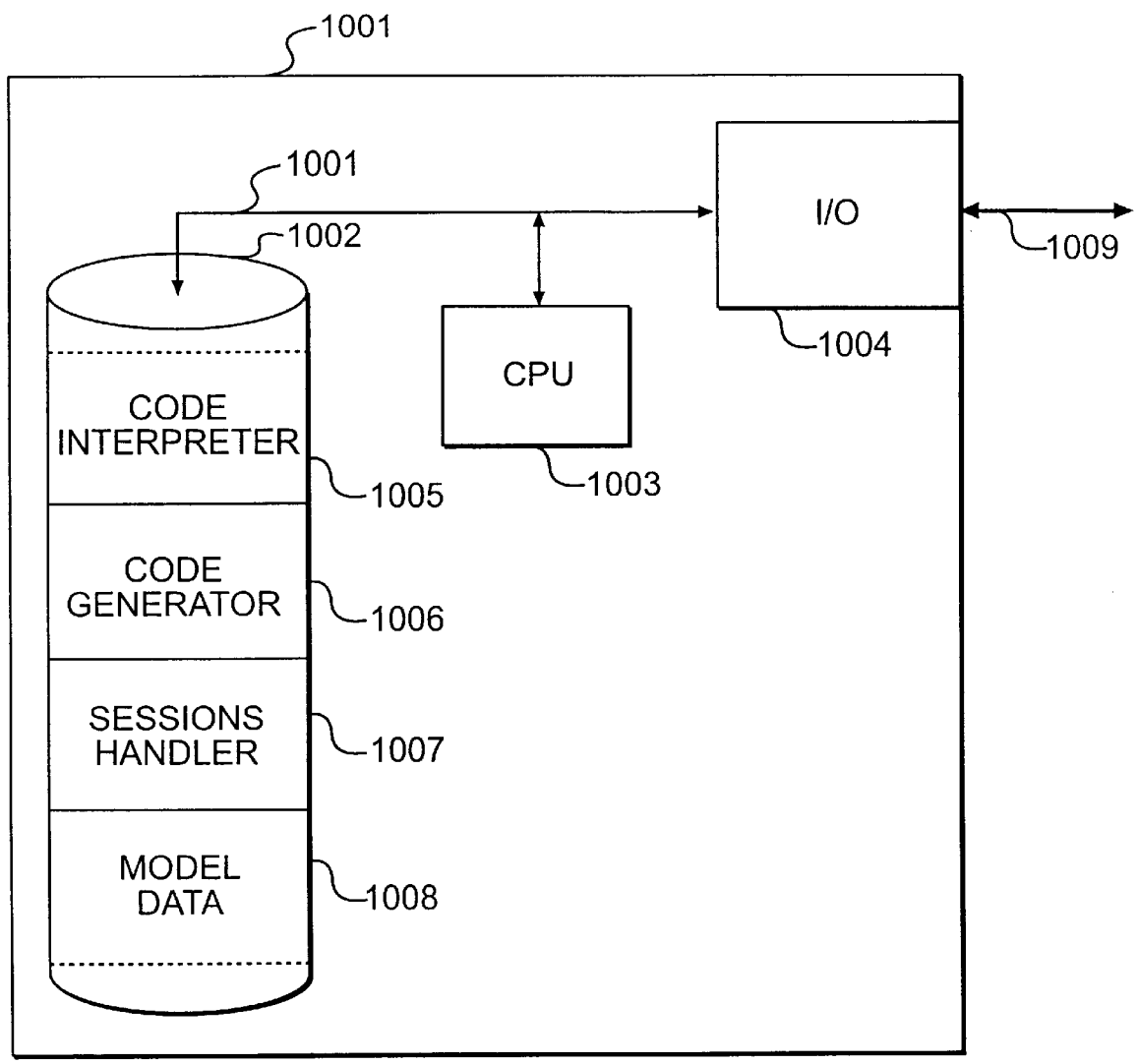
FIG. 10 shows a server computer system for handling geometrical constructions according to the invention.

FIG. 10 shows a server computer system for handling geometrical constructions according to the invention. The server computer system generally designated 1001 is used to serve a number of client computer systems. The server comprises a memory 1002 partly implemented as a volatile and a non-volatile memory means e.g. a hard-disc and a random access memory (RAM) The memory comprises procedures or programs 'Code Interpreter' 1005, 'Code Generator' 1006, and 'Sessions Handler' 1007 executable by the central processing unit 1003. Further, the memory comprises 'Model Data' 1008 e.g. in the form of geometrical descriptions, descriptions of models, etc.

In order to load models, geometrical descriptions, or other data or to distribute data to client computer systems, the server computer system comprises an input/output unit (I/O) 1004. The input/output unit can be used as an interface to different types of storage mediums and different types of computer networks, e.g. the Internet.

Data exchange between the memory 1002, the central processing unit (CPU) 1003, and the input/output unit 1004 is provided by means of the data bus 1009.

Turning now to a detailed description of the functions/ computer programs referred to in the description of FIG. 9 and 10.

Figure 11:
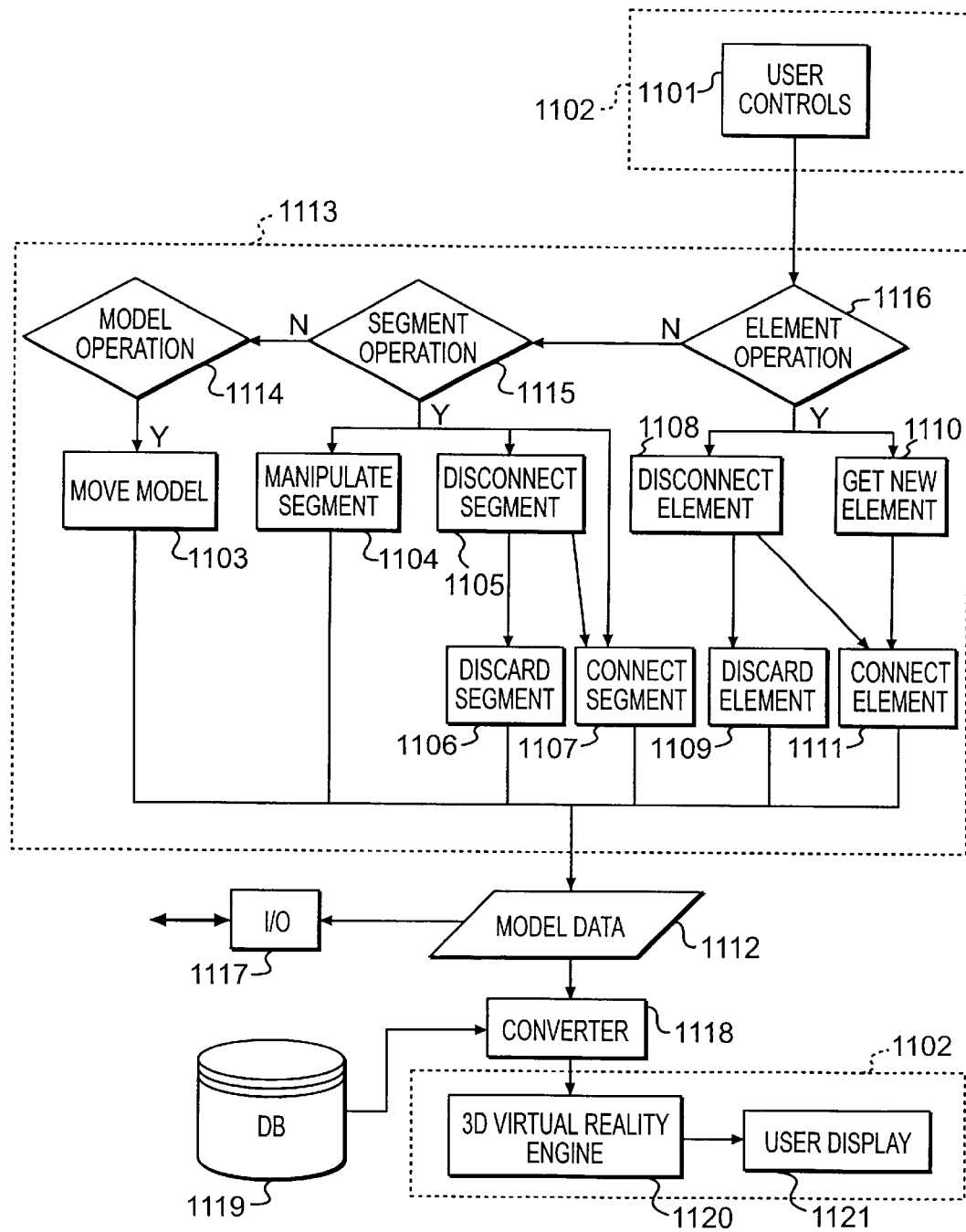
FIG. 11 shows a flowchart for a method of concurrently constructing segments and models while the segments and models are subject to manipulation.

FIG. 11 shows a flowchart for a method of concurrently constructing segments and models while the segments and models are subject to manipulation. This flowchart also describes the operation of a procedure executed on a client and/or server computer for handling a model according to the invention.

In step 1101 a users commands entered by means of User Controls being a part of the user interface 1102 are received. User controls can be of many different types e.g. comprising a computer keyboard, joystick, or mouse in interaction with a User Display 1121, thereby providing signals to a program in order to represent a users interaction with the user interface. E.g. a user can select an element displayed on the User Display 1121 and move it to a desired position by means of a computer mouse using the well-known drag-and-drop operation. Thus a user command representing this movement of the element is generated. Such operation of the.user interface is also known as event-driven programming.

The User Command is received in the block 1113 of the flowchart and used to create, update, or manipulate model data 1112 according to the invention. The model data 1112 being a result of the processing in the block 1113 can be transferred to a communication network via an input/output device 1117. Thus it is possible to exchange models with other users, share models, load models from a server, save models on a server etc. Typically, the model data 1112 is merged with data representing the appearance of stored elements by means of the converter 1118. The converter uses the previously defined 'ShapeReference' to obtain a geometrical representation of this appearance from the database 1119. Further, in the converter 1118 the geometrical representation and the previously defined Blocks and Fields describing the shape of a specific model are combined and converted into a format that can be interpreted by a 3D Virtual Reality Engine 1120. The 3D Virtual Reality Engine 1120 provides information representing the model, such that the model can be visualised on a User Display 1121.

Turning now to a detailed description of the block 1113 of the flowchart.

When a User Command is received it is determined whether the User Command concerns an element operation, a segment operation, or a Model operation. An element operation is detected in step 1116 if an element is added to the model, removed from the model or moved from a first to a second position within the model. A Segment operation is detected in step 1115 if a segment in the model is moved, removed, or manipulated or alternatively, if a new segment is added to the model. A model operation is detected in step 1114 if a Model is manipulated ie moved freely without being constrained to the grid or if e.g. a segment is placed freely also without being constrained to the grid.

According to the detected operation model data is created, updated, or manipulated.

If the user selects an element from a library of elements e.g. comprising the elements shown in FIG. 4, step 1110 Get New Element is entered and the selected element is identified as being e.g. of the type 'T401'. Subsequently, in step 1111 the selected element is connected to another element already being in the world or alternatively the element is placed alone thereby being handled as a segment. When the selected element is connected, the code representing this element, its position, and orientation is appended to an existing code, or new code is generated.

If another element exists in the world, the user can decide to select this element and move or disconnect the element from its current position. If such an event is detected, the part of the existing code representing the element is removed and stored temporarily.

The selected element can either be discarded or connected/moved to an other position. If the event that the element is discarded is detected, the element will disappear from the user interface and the temporary code will be deleted in step 1109. Alternatively, if the event that the element is connected to another position is detected, code representing the element, its new position, and orientation is generated and inserted into the existing code.

In order to accelerate the process of generating or revising an existing model an entire segment comprising other segments and elements can be handled as a single object.

If a segment exists in the world the user can decide to select this segment and move or disconnect the segment from its current position by means of an action being common for all segments and element within the segment subject for movement or disconnection. If such an event is detected, the part of the existing code representing the entire segment is removed and stored temporarily.

If the event that the entire segment should be discarded is detected, the entire segment will disappear from the user interface and the temporary code will be deleted in step 1106. Alternatively, it the event that the element is connected to another position is detected, code representing the segment, its new position, and orientation is generated and inserted into the existing code.

Moreover, segments can be manipulated and models can be moved. If segments exist in the world, they can be manipulated, ie elements or other segments within the segment subject for manipulation are not changed but the segment can e.g. be rotated a specified angle or stated to rotate with a specified angular velocity. This can be done by detecting a specified event from the user interface and in step 1104 modifying the code for the segment subject for manipulation, e.g. by modifying the parameters in the Rotate field of a segment block.

If models exist in the world, they can be moved similarly to manipulating a segment, but instead modifying the parameters in the Rotate and Translate fields of a model block in step 1103.

On a predefined event the procedure can be terminated or stopped in step 1112, comprising e.g. storing created segments and models.

Figure 12:
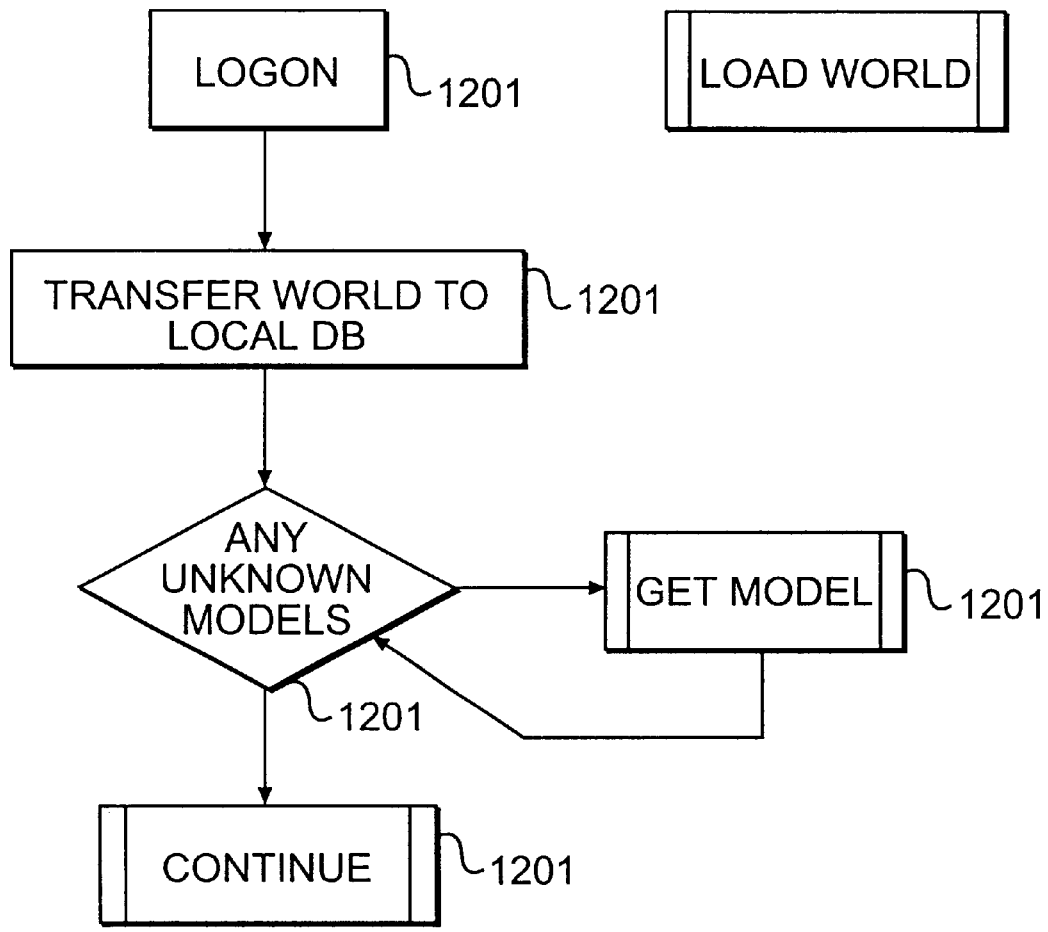
FIG. 12 shows a flowchart for a method of accessing and sharing a common world accessible to multiple clients.

FIG. 12 shows a flowchart for a method of accessing and sharing a common world accessible for multiple clients. In a preferred embodiment of the invention, a server holds a model of a world. The model can be distributed to a number of clients which are allowed to manipulate or otherwise change segments and models in the world, or new models and segments can be added to the world. Changes made by respective clients can be transferred to other clients sharing the same world. Thus a respective client will experience that his local copy of the world will change if other clients make any changes in the model of the world. Such an update of the clients local copy of the world must be executed very fast and efficient if a larger number of users should be supported and excessive update times should be avoided. This is made possible with the present invention and is the key to providing a common world accessible for multiple clients which appears to be ever changing due to different clients own interaction with the world.

In the first step 1201 of the flowchart Load World a log-on session between a client and the server is executed comprising identifying the clients name, a proper data transfer protocol etc. In the next step 1202 the servers description of the world is transferred to the client. Before, during, or after this data transfer, the client and the server exchange information to establish whether all components ie models, segments, elements etc. in the model are known by the client. This verification is executed in step 1203. If there are any unknown models in the world, a proper description of the relevant models are transferred in step 1204. If there are no unknown models, the client is considered to have a copy of the world and is thus allowed to manipulate models and segments or otherwise make changes in the world.

In the following, a method is presented for supplying a client with further information according to the hierarchical structure of a model according to the invention. IL is assumed that models, segments, elements, and other components of a model have a unique identification number. Thus the server may request the client whether e.g. a specific model is present, if the specific model is present no further data need to be transferred, otherwise the server may request the client whether specific segment(s) of the specific model is (are) present. In this way only unknown model components need to be transferred to the client.

Figure 13:
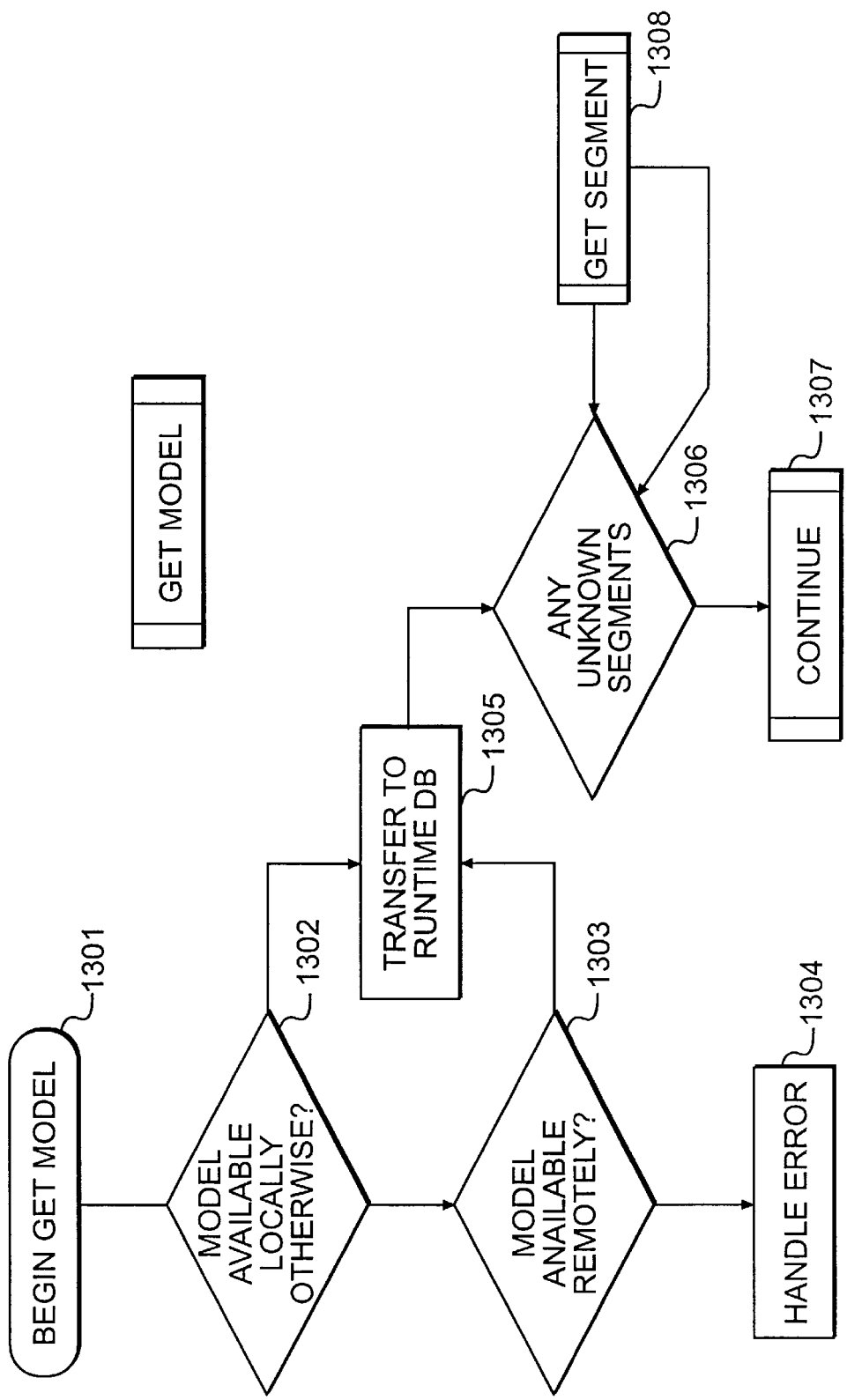
FIG. 13 shows flowchart for a method of transferring model information.

FIG. 13 shows a flowchart for a method of obtaining known models, segments, and elements. However, it is only shown how to obtain unknown models, because the flowchart is generally applicable to getting models, segments, and elements by investigating the respective levels of the model hierarchy successively.

In the first step 1301 of the flowchart Get Model the method of getting a model is entered. In step 1302 it is verified whether the model is available at the client in any form, if it is, the model is transferred locally to a runtime database in step 1305. The runtime database is responsible for holding components which are part of the world with which the client wishes to interact. Alternatively, if the model is not available locally but is available remotely, ie at the server, the model is transferred from the server to the runtime database located at client. This decision is made in step 1303 and data transferred in step 1305. If the decision in step 1303 is that the model is not available remotely either, an error must be handled in step 1304.

If the models that are subject for transfer from the server to the client comprise segments not known by the client, these segments are interchanged likewise for the unknown models. It is verified whether there are any unknown segments in the exchanged models in step 1306. If there are unknown segments, these are exchanged in step 1308, otherwise the client is allowed to continue modifying the world model in step 1307.

The preferred embodiment as shown in the FIGS. 9, 10, 11, 12, and 13 can be implemented in hardware, software, or a combination thereof.

The software can be distributed by means of any data storage or data transmission medium. The medium comprises floppy discs, CD-ROM, mini disc, compact disc or a network. The network may be e.g. the Internet. Via the network a software embodiment of the invention may be distributed by downloading a computer program.

Further, geometrical descriptions of elements, parts of models, or complete models can be distributed or interchanged by means of any of the above-mentioned data storage or data transmission mediums.

It should be noted that although the representation of the parameters defined for the respective fields are stated by means of easy-to-read letters and numbers the representation of a model according to the invention is by no means limited to such a representation. As a matter of fact, typically, a compressed or encoded representation of the parameters will be used. This can be done be means of a known method within the field of data compression.

Moreover, it should be noted that the statements in the code structure can be converted into bits in a token representation. The token representation can thus be transferred between computers as a compact data structure or data packet.

In the following cited references there are disclosed elements which are preferred to be described by a geometrical description (e.g. VRML, 3DMF, etc) and used as elements in a model according to the invention.

U.S. Pat. No. 5,645,463 assigned to Interlego AG discloses a toy building element comprising a base plate and a disc pivotally mounted in a circular aperture in the base plate. As well the base plate as the disc comprises connection means arranged in a modular grid. In a preferred embodiment the building element is modelled according to the invention by taking the base plate as a first segment or a part of a first segment and by taking the disc as a second segment of a part of a second segment. From the previous description of the invention it will appear that it is possible to model a rotation of the disc in the base plate by means of an axis field and a rotate field. The rotational axis is modelled to be in the centre of the base plate having a direction perpendicular to the plane of the base plate. U.S. Pat. No. 5,645,463 is hereby incorporated as a reference for all it discloses.

U.S. Pat. No. 4,214,403 assigned to Interlego AG discloses a toy hinge element comprising a pair of box-shaped toy building blocks hingedly interconnected by means of a tubular bush in one corner in a first of the two blocks and a complementary pivot pin in a second of the two blocks. In a preferred embodiment the building element is modelled according to the invention by taking the first block as a first segment and the second block as a second segment. It is possible to model a rotation of the first block relatively to the second block by means of an axis field and a rotate field. The rotational axis is modelled to be in the centre of the pivot pin having a direction following the pivot pin. In the description of U.S. Pat. No. 4,214,403 it appears that both of the blocks can be connected to other blocks in a rigid interconnected manner. These other blocks can be modelled as elements in the first or second segment, respectively. U.S. Pat. No. 4,214,403 is hereby incorporated as a reference for all it discloses.

U.S. Pat. No. 5,645,463 assigned to Interlego AG discloses a further toy building element comprising multiple types of connection means e.g. holes for supporting axes, connection studs and tabs, and grip means for snapping elements into interconnection. It is also possible to model this toy building element according to the invention including models of elements it is adapted to be interconnected with. Other elements can be connected to the disclosed element by means of the above mentioned connection means. When such an element is modelled according to invention, it is possible to specify the element as a segment, supporting interconnection with other segments at positions coincident with the position of the connection means. This is done by appending the Axis fields and Rotate fields as described above. U.S. Pat. No. 5,645,463 is hereby incorporated as a reference for all it discloses.

U.S. Pat. No. 5,061,219 assigned to Magic Mold Corporation discloses a construction toy building element comprising multiple types of connection means e.g. holes for supporting axes, hub-like connectors for having one or more gripping sockets, and structural elements, e.g. of strutlike configuration, having end portions configured to be received in the gripping sockets. The construction toy building element can be modelled as an element having four possible orientations with respect to a first axis, four possible orientations with respect to a second axis being orthogonal to the first axis, and having eight possible orientations with respect to a third axis being orthogonal to the first and second axis. The centre hole of the hub-like connector can be used as a reference for describing the position of the toy element. U.S. Pat. No. 5,061,219 is hereby incorporated as a reference for all it discloses.

Further, construction toy building elements disclosed in U.S. Pat. Nos. 5,423,707; 5,137,486; 5,199,919; 5,421,762; and 5,238,438 are hereby incorporated as references for all they discloses.

It is evident that the invention may be used to model other modular building systems than those shown in the above.

Although the invention has been described with reference to a rectangular system of co-ordinates, other systems of co-ordinates can be used for the definitions used according to the invention.

The invention is not limited to the shown code, this code is selected as a preferred embodiment. Thus the invention is not limited to the specific block and field statements (e.g. Segment Block, Transplate Field etc). The representation of the parameters (e.g. an offset value of 4, an angle of rotation of 90 degrees etc) is used in this disclosure as an easy to read and understand presentation in this disclosure. However, it is well-known for a person skilled in the art to convert this representation into a sufficient representation expedient for storage on a computer readable medium. Such a representation is handled on a computer by means of a data structure. A data structure comprises all types of data stored in the memory on a computer or stored on a computer readable medium.

In the description, the term 'geometrical object' should be understood as a real world or virtual world object which is subjected to be modelled according to the invention.

In the description, the term 'manipulation' should be interpreted very broadly comprising the action of moving and/or rotating parts the geometrical interpretation of a model.

In the description, the term 'meta-description' is the actual description of a manipulation.

The general term 'to model' or 'a model according to the invention' should not be confused with the term 'Model block'.

The basic idea of the invention is that the model is constrained very hard which—prima facia—seems to limit the capabilities of the modelling concept. However, this in fact makes it possible to select a very compact representation of the model which again leads to a very flexible model structure in that its representation is very compact and easy to access thus allowing for a last and efficient processing in modifying, interacting, or manipulating a model according to the invention. Further, it is possible to transmit a model of a rather complex object via a transmission network very fast.

What is claimed is:

1. A method of generating a computer readable model of a geometrical object, the model being generated on a computer having access to a database including representations of geometrical shapes for a collection of elements, the method comprising the steps of:

encoding bits in a data structure to identify a first set of elements from said collection and to represent positions of the elements by integer co-ordinates that constrain the positions to integer co-ordinates within a first system of co-ordinates;

encoding bits in the data structure to identify a second set of elements from said collection and to represent positions of the elements by integer co-ordinates that constrain the positions to integer co-ordinates within a second system of co-ordinates;

encoding bits in the data structure to represent a spatial transformation of the second system of co-ordinates relative to the first system of co-ordinates, which transformation is not constrained to integer displacements;

taking said data structure as a computer readable model of a geometrical object.

2. A method according to claim 1, wherein the step of encoding bits in said data structure comprises the step of:

encoding said bits in said data structure to represent a position of an axis and to represent a rotation of said second system of co-ordinates about said axis and relatively to said second system of co-ordinates.

3. A method according to claim 2, wherein the step of encoding bits in said data structure further comprises the step of:

encoding said bits in said data structure to represent said position of said axis by integer co-ordinates in said second system of co-ordinates.

4. A method according to claim 3, further comprising the steps of:

encoding said bits in said data structure to represent said position of said axis, thereby defining a co-ordinate of interconnection with elements in said second system of co-ordinates in said first system of co-ordinates;

defining a new co-ordinate of interconnection in said first system of co-ordinates to represent a new position of elements within said second system of co-ordinates relatively to said first system of co-ordinates;

encoding said bits in said data structure to represent the new position of said axis, said new position being said new co-ordinate of interconnection.

5. A method according to claim 3, wherein the step of encoding bits in said data structure further comprises the step of:

encoding said bits in said data structure to represent an orientation of said axis, by identifying a direction along one axis in a set of predefined mutually orthogonal axes.

6. A method according to claim 1, further comprising the step of:
  encoding bits in said data structure to represent orientations of said elements in said first and second system of co-ordinates, respectively.

7. A method according to claim 6, further comprising the step of:
  encoding bits to represent orientations of said elements by identifying a direction along one axis in a set of predefined mutually orthogonal axes.

8. A method according to claim 1, further comprising the steps of:
  encoding bits in the data structure to represent a spatial transformation of said first and second system of co-ordinates relatively to a third system of co-ordinates
  including said fourth data structure in the computer readable model of a geometrical object.

9. A method according to claim 1, wherein each of said integer co-ordinates is capable of identifying a three dimensional volume and vice versa, and wherein the size of said three dimensional volume is adapted to allow for a position representation of two elements by means of said integer co-ordinates such that said two elements are adjoint in order to form a coherent geometrical object.

10. A method according to claim 1, wherein said elements comprises representations of geometrical shapes resembling well-known toy building elements.

11. A method according to claim 1, wherein said elements comprises representations of geometrical shapes whereof at least a part of said shapes is adapted to resemble connection means or visualisations of possible interconnections of elements.

12. A method according to claim 1, wherein said representations of geometrical shapes for a collection of elements comprises non-integer co-ordinates in a system of co-ordinates.

13. A method according to claim 1, further comprising the steps of:
  encoding said bits in said second data structure to represent said integer co-ordinates relatively to an origin in said second system of co-ordinates; said origin defining a co-ordinate of interconnection with elements in said first system of co-ordinates;
  defining a hew origin in said second system of co-ordinates in response to a new co-ordinate of interconnection in said second system of co-ordinates;
  calculating new positions of said elements within said second system of co-ordinates as a result of said new origin;
  encoding said bits in said second data structure to represent the result of said calculation.

14. A method according to claim 1, further comprising the steps of:
  executing said method on a computer having a user interface including user controls providing signals representing an interaction between a user and said user interface, said interaction comprising modification and/or manipulation of a geometrical representation of said computer readable model;
  converting said signals into a computer readable model or a modified computer readable model.

15. A method according to claim 1, further comprising the step of:
  converting said computer readable model into a computer readable file comprising ASCII characters representing the computer readable model.

16. A method according to claim 1, further comprising the step of:
  converting said computer readable model into a binary file type representing the computer readable model.

17. A method according to claim 1, further comprising the step of:
  transmitting said encoded bits or said computer readable model via a communication network connected to said computer.

18. A method according to claim 17 further comprising the step of:
  receiving said encoded bits or said computer readable model on a computer via a communication network connected to the computer.

19. A method according to claim 1 further comprising the steps of:
  detaching said database into a local database and a remote database;
  firstly, for each element consulting said local database to examine whether the representation of said geometrical shape is available locally:
  secondly, if said representation of said geometrical shape is available locally, retrieving the geometrical shape from the local database, or alternatively, if said geometrical shape is not available locally retrieving the geometrical shape from the remote database, if said geometrical shape exists in the remote database.

20. A method according to claim 1 further comprising the steps of:
  generating displayable data representing said geometrical shapes as their spatial interrelationship is described according to said first, second, and third data structure.

21. A method of interpreting a computer readable model of a geometrical object, the model being interpreted on a computer having a user interface and the computer having access to a database including representations of geometrical shapes for a collection of elements, the method comprising the steps of:
  decoding bits in a data structure to identify a first set of elements from said collection and to identify positions of the elements by Integer co-ordinates that constrain the positions to integer co-ordinates within a first system of co-ordinates;
  decoding bits in the data structure to identify a second set of elements from said collection and to identify positions of the elements by integer co-ordinates that constrain the positions to integer co-ordinates within a second system of co-ordinates;
  decoding bits in the data structure to identify a spatial transformation of the second system of co-ordinates relatively to the first system of co-ordinates which transformation is not constrained to integer displacements;
  retrieving said identified representations of geometrical shapes and generating displayable data representing said geometrical shapes as their spatial interrelationship is described according to said data structure.

22. A method according to claim 21, wherein the step of decoding bits in said data structure comprises the step of:
  decoding said bits in said data structure to identify a position of an axis and to identify a rotation of said second system of co-ordinates about said axis and relative to said second system of co-ordinates.

23. A method according to claim 22, wherein the step of decoding bits in said third data structure further comprises the step of:

decoding said bits in said data structure to identify said position of said axis by integer co-ordinates in said second system of co-ordinates.

24. A method according to claim 23, further comprising the steps of:
decoding said bits in said data structure to represent said position of said axis, thereby defining a co-ordinate of interconnection in said first system of co-ordinates;
defining a new co-ordinate of interconnection in said first system of co-ordinates to represent a new position of elements within said second system of co-ordinates relatively to said first system of co-ordinates;
encoding said bits in said data structure to represent the new position of said axis, said new position being said new co-ordinate of interconnection.

25. A method according to claim 22, wherein the step of decoding bits in said data structure further comprises the step of:
decoding said bits of said data structure to identify an orientation of said axis, by identifying a direction alone one axis in a set of predefined mutually orthogonal axes.

26. A method according to claim 21, further comprising the step of:
decoding bits in said data structure to identify orientations of said elements in said first and second system of co-ordinates.

27. A method according to claim 26, further comprising the step of:
decoding bits to identify orientations of said elements by reading an identification of a direction along one axis in a set of predefined mutually orthogonal axes.

28. A method according to claim 21, further comprising the step of:
decoding bits in the data structure to identify a spatial transformation of said first and second system of co-ordinates relatively to a third system of co-ordinates; and
modifying said displayable data to appear according to said spatial transformation.

29. A method according to claim 21, wherein each of said integer co-ordinates is capable of identifying a three dimensional volume and vice versa, and wherein the size of said three dimensional volume is adapted to allow for a displayable position of two elements by means of said integer co-ordinates such that said two elements are adjoint in order to form a coherent geometrical object.

30. A method according to claim 21, wherein said elements comprises representations of geometrical shapes resembling well-known toy building elements.

31. A method according to claim 21, wherein said elements comprises representations of geometrical shapes whereof at least a part of said shapes is adapted to resemble connection means or visualisations of possible interconnections of elements.

32. A method according to claim 21, wherein said representations of geometrical shapes for a collection of elements comprises non-integer co-ordinates in a system of co-ordinates.

33. A method according to claim 21, further comprising the steps of:
decoding said bits in said data structure to represent said integer co-ordinates relatively to an origin in said second system of co-ordinates; said origin defining a co-ordinate of interconnection with elements in said first system of co-ordinates;
defining a new origin in said second system of co-ordinates in response to a new a co-ordinate of interconnection in said second system of co-ordinates;
calculating new positions of said elements within said second system of co-ordinates as a result of said new origin;
encoding said bits in said data structure to represent the result of said calculation.

34. A method according to claim 21, further comprising the steps of:
executing said method on a computer having a user interface including user controls providing signals representing an interaction between a user and said user interface, said interaction comprising modification and/or manipulation of a geometrical representation of said computer readable model;
converting said signals into a computer readable model or a modified computer readable model.

35. A method according to claim 21, further comprising the step of:
converting said computer readable model into displayable data by calculating a projection of said geometrical shapes as they appear according to said data structures onto a plane or curved expanse.

36. A method according to claim 21, further comprising the step of:
reading said computer readable model from a binary file type representing the computer readable model.

37. A method according to claim 21, further comprising the step of:
transmitting said bits or said computer readable model via a communication network connected to said computer.

38. A method according to claim 37 further comprising the step of;
receiving said bits or said computer readable model on a computer via a communication network connected to the computer.

39. A method according to claim 21 further comprising the steps of:
detaching said database into a local database and a remote database;
firstly, for each element consulting said local database to examine whether the representation of the geometrical shape is available locally;
secondly, if said geometrical shape is available locally, retrieving the geometrical shape from the local database, or alternatively, if said geometrical shape is not available locally retrieving the geometrical shape from the remote database, if the shape exists in the remote database.

40. A computer system for generating a computer readable model of a geometrical object, comprising:
a central processing unit;
a memory unit comprising:
a database including representations of geometrical shapes for a collection of elements;
software for encoding bits in a data structure to identify a first set of elements from said collection and to represent positions of the elements by integer co-ordinates that constrain the positions to integer co-ordinates within a first system of co-ordinates;
software for encoding bits in the data structure to identify a second set of elements from said collection and to represent positions of the elements by Integer co-ordinates that constrain the positions to integer co-ordinates within a second system of co-ordinates;

software for encoding bits in the data structure to represent a spatial transformation of the second system of co-ordinates relatively to the first system of co-ordinates, which transformation is not constrained to integer displacements;

software for taking said data structure as a computer readable model of a geometrical object.

41. A computer system according to claim 40, wherein the software for encoding bits in said data structure comprises:

software for encoding said bits in said third data structure to represent a position of an axis and to represent a rotation of said second system of co-ordinates about said axis and relatively to said second system of co-ordinates.

42. A computer system according to claim 41, wherein the software for encoding bits in said data structure further comprises:

software for encoding said bits in said data structure to represent said position of said axis by integer co-ordinates in said axis by integer co-ordinates in said second system of co-ordinates.

43. A computer system according to claim 41, wherein the software for encoding bits in said data structure further comprises:

software for encoding said bits in said data structure to represent an orientation of said axis, by identifying a direction along one axis in a set of predefined mutually orthogonal axes.

44. A computer system according to claim 43, further comprising:

software for encoding said bits in said data structure to represent said position of said axis, thereby defining a co-ordinate of interconnection with elements in said second system of co-ordinates in said first system of co-ordinates;

software for defining a new co-ordinate of interconnection in said first system of co-ordinates to represent a new position of elements within said second system of co-ordinates relatively to said first system of co-ordinates;

software for encoding said bits in said data structure to represent the new position of said axis, said new position being said new co-ordinate of interconnection.

45. A computer system according to claim 40, further comprising:

software for encoding bits in said data structure to represent orientations of said elements in said first and second system of co-ordinates.

46. A computer system according to claim 45, further comprising:

software for encoding bits to represent orientations of said elements by identifying a direction along one axis in a set of predefined mutually orthogonal axes.

47. A computer system according to claim 40, further comprising:

software for encoding bits in the data structure to represent a spatial transformation of said first and second system of co-ordinates relatively to a third system of co-ordinates.

48. A computer system according to claim 40, wherein each of said integer co-ordinates is capable of identifying a three dimensional volume and vice versa, and wherein the size of said three dimensional volume is adapted to allow for a position representation of two elements by means of said integer co-ordinates such that said two elements are adjoint in order to form a coherent geometrical object.

49. A computer system according to claim 40, wherein said elements comprises representations of geometrical shapes resembling well-known toy building elements.

50. A computer system according to claim 40, wherein said elements comprises representations of geometrical shapes whereof at least a part of said shapes is adapted to resemble connection means or visualisations of possible interconnections of elements.

51. A computer system according to claim 40, wherein said representations of geometrical shapes for a collection of elements comprises non-integer co-ordinates in a system of co-ordinates.

52. A computer system according to claim 40, further comprising:

software for encoding said bits in said data structure to represent said integer co-ordinates relatively to an origin in said second system of co-ordinates; said origin defining a co-ordinate of interconnection with elements in said first system of co-ordinates;

software for defining a new origin in said second system of co-ordinates in response to a new co-ordinate or interconnection in said second system of co-ordinates;

software for calculating new positions of said elements within said second system of co-ordinates as a result of said new origin;

software for encoding said bits in said data structure to represent the result of said calculation.

53. A computer system according to claim 40, further comprising:

a user interface including user controls providing signals representing an interaction between a user and said user interface, said interaction comprising modification and/or manipulation of a geometrical representation of said computer readable model;

software for converting said signals into a computer readable model or a modified computer readable model.

54. A computer system according to claim 40, further comprising:

converting said computer readable model into a computer readable file comprising ASCII characters representing the computer readable model.

55. A computer system according to claim 40, further comprising:

software for converting said computer readable model into a binary file type representing the computer readable model.

56. A computer system according to claim 40, further comprising:

means for transmitting said encoded bits or said computer readable model via a communication network connected to said computer.

57. A computer system according to claim 56 further comprising:

means for receiving said encoded bits or said computer readable model on a computer via a communication network connected to the computer.

58. A computer system according to claim 40 further comprising:

a local database and a remote database both including representations of geometrical shapes;

software for, firstly, for each element consulting said local database to examine whether the representation of said geometrical shape is available locally;

software for, secondly, if said representation of said geometrical shape is available locally, retrieving the geometrical shape from the local database, or alternatively, if said geometrical shape is not available locally retrieving the geometrical shape from the remote database, if said geometrical shape exists in the remote database.

59. A computer system according to claim 40 further comprising:
software for generating displayable data representing said geometrical shapes as their spatial interrelationship is described according to said data structure.

60. A computer system for interpreting a computer readable model of a geometrical object, comprising:
a central processing unit;
a database including representations of geometrical shapes for a collection of elements;
a memory unit comprising:
a database including representations of geometrical shapes for a collection of elements;
software for decoding bits in a data structure to identify a first set of elements from said collection and to identify positions of the elements by integer co-ordinates that constrain the positions to integer co-ordinates within a first system of co-ordinates;
software for decoding bits in the data structure to identify a second set of elements from said collection and to identify positions of the elements by integer co-ordinates that constrain the positions to integer co-ordinates within a second system of co-ordinates;
software for decoding bits in the data structure to identify a spatial transformation of the second system of co-ordinates relatively to the first system of co-ordinates, which transformation is not constrained to integer displacements;
software for retrieving said identified representations of geometrical shapes and generating displayable data representing said geometrical shapes as their spatial interrelationship is described according to said data structure.

61. A computer system according to claim 60, wherein the software for decoding bits in said data structure comprises:
software for decoding said bits in said data structure to identify a position of an axis and to identify a rotation of said second system of co-ordinates about said axis and relatively to said second system of co-ordinates.

62. A computer system according to claim 61, wherein the software for decoding bits in said data structure further comprises:
software for decoding said bits in said data structure to identify said position of said axis by integer co-ordinates in said second system of co-ordinates.

63. A computer system according to claim 62, further comprising:
software for decoding said bits in said data structure to represent said position of said axis, thereby defining a co-ordinate of interconnection in said first system of co-ordinates;
software for defining a new co-ordinate of interconnection in said first system of co-ordinates to represent a new position of elements within said second system of co-ordinates relatively to said first system of co-ordinates;
software for encoding said bits in said data structure to represent the new position of said axis, said new position being said new co-ordinate of interconnection.

64. A computer system according to claim 61, wherein the software for decoding bits in said third data structure further comprises:

software for decoding said bits in said third data structure to identify an orientation of said axis, by identifying a direction along one axis in a set of predefined mutually orthogonal axes.

65. A computer system according to claim 60, further comprising:
software for decoding bits in said data structure to identify orientations of said elements in said first and second system of co-ordinates.

66. A computer system according to claim 65, further comprising:
software for decoding bits to identify orientations of said elements by reading an identification of a direction along one axis in a set of predefined mutually orthogonal axes.

67. A computer system according to claim 60, further comprising:
software for decoding bits in the data structure to identify a spatial transformation of said first and second system of co-ordinates relatively to a third system of co-ordinates;
software for modifying said displayable data to appear according to said spatial transformation.

68. A computer system according to claim 60, wherein each of said integer co-ordinates is capable of identifying a three dimensional volume and vice versa, and wherein the size of said three dimensional volume is adapted to allow for a displayable position of two elements by means of said integer co-ordinates such that said two elements are adjoint in order to form a coherent geometrical object.

69. A computer system according to claim 60, wherein said elements comprises representations of geometrical shapes resembling well-known toy building elements.

70. A computer system according to claim 60, wherein said elements comprises representations of geometrical shapes whereof at least a part of said shapes is adapted to resemble connection means or visualisations of possible interconnections of elements.

71. A computer system according to claim 60, wherein said representations of geometrical shapes for a collection of elements comprises non-integer co-ordinates in a system of co-ordinates.

72. A computer system according to claim 60, further comprising:
software for decoding said bits in said data structure to represent said integer co-ordinates relatively to an origin in said second system of co-ordinates; said origin defining a co-ordinate of interconnection with elements in said first system of co-ordinates;
software for defining a new origin in said second system of co-ordinates in response to a new a co-ordinate of interconnection in said second system of co-ordinates;
software for calculating new positions of said elements within said second system of co-ordinates as a result of said new origin;
software for encoding said bits in said data structure to represent the result of said calculation.

73. A computer system according to claim 60, further comprising:
software for executing said method on a computer having a user interface including user controls providing signals representing an interaction between a user and said user interface, said interaction comprising modification and/or manipulation of a geometrical representation of said computer readable model;
software for converting said signals into a computer readable model or a modified computer readable model.

74. A computer system according to claim 60, further comprising:
    converting said computer readable model into displayable data by calculating a projection of said geometrical shapes as they appear according to said data structures onto a plane or curved expanse.

75. A computer system according to claim 60, further comprising:
    software for reading said computer readable model from a binary file type representing the computer readable model.

76. A computer system according to claim 60, further comprising;
    means for transmitting said bits or said computer readable model via a communication network connected to said computers.

77. A computer system according to claim 76 further comprising the step of:
    means for receiving said bits or said computer readable model on a computer via a communication network connected to the computer.

78. A computer system according to claim 60 further comprising:
    a local database and a remote database including representations of geometrical shapes;
    software for, firstly, for each element consulting said local database to examine whether the representation of the geometrical shape is available locally;
    software for, secondly, if said geometrical shape is available locally, retrieving the geometrical shape from the local database, or alternatively, if said geometrical shape is not available locally retrieving the geometrical shape from the remote database, if the shape exists in the remote database.

79. A model of a geometrical object comprising:
    bits in said data structure encoded to identify a first set of elements from a collection of representations of geometrical shapes for a collection of elements and to represent positions of the elements by integer co-ordinates that constrain the positions to integer co-ordinates within a first system of co-ordinates;
    bits in the data structure encoded to identify a second set of elements from said collection and to represent positions of the elements by integer co-ordinates that constrain the positions to integer co-ordinates within a second system of co-ordinates;
    bits in the data structure encoded to represent a spatial transformation of the second system of co-ordinates relative to the first system of co-ordinates, which transformation is not constrained to integer displacements.

80. A model according to claim 79, comprising:
    bits in said data structure encoded to represent a position of an axis and to represent a rotation of said second system of co-ordinates about said axis and relatively to said second system of co-ordinates.

81. A model according to claim 80, comprising:
    bits in said third data structure encoded to represent said position of said axis by means of integer co-ordinates in said second system of co-ordinates.

82. A model according to claim 80, comprising:
    bits in said third data structure encoded to represent an orientation of said axis, by identifying a direction along one axis in a set of predefined mutually orthogonal axes.

83. A model according to claim 79, comprising:
    bits in said data structure encoded to represent orientations of said elements in said first and second system of co-ordinates, respectively.

84. A model according to claim 83, comprising:
    bits encoded to represent orientations of said elements by identifying a direction along one axis in a set of predefined mutually orthogonal axes.

85. A model according to claim 79, comprising:
    bits in the data structure encoded to represent a spatial transformation of said first and second system of co-ordinates relatively to a third system of co-ordinates.

86. A model according to claim 79, wherein each of said integer co-ordinates is capable of identifying a three dimensional volume and vice versa, and wherein the size of said three dimensional volume is adapted to allow for a position representation of two elements by means of said integer co-ordinates such that said two elements are adjoint in order to form a coherent geometrical object.

87. A model according to claim 79, wherein said elements comprises representations of geometrical shapes resembling well-known toy building elements.

88. A model according to claim 79, wherein said elements comprises representations of geometrical shapes whereof at least a part of said shapes is adapted to resemble connection means or visualisations of possible interconnections of elements.

89. A model according to claim 79, wherein said representations of geometrical shapes for a collection of elements comprises non-integer co-ordinates in a system of co-ordinates.

* * * * *

UNITED STATES PATENT AND TRADEMARK OFFICE
CERTIFICATE OF CORRECTION

PATENT NO. : 6,389,375 B1
DATED : May 14, 2002
INVENTOR(S) : Michael Thomsen et al.

It is certified that error appears in the above-identified patent and that said Letters Patent is hereby corrected as shown below:

Column 24,
Line 61, "claim 3" should read -- claim 2 --.

Column 25,
Line 44, "hew" should read -- new --.

Column 26,
Line 21, "locally:" should read -- locally; --.
Line 41, "Integer" should read -- integer --.

Column 27,
Line 20, "alone" should read -- along --.
Line 35, "step" should read -- steps --.

Column 28,
Line 34, "step of;" should read -- step of: --.
Line 65, "Integer" should read -- integer --.

Signed and Sealed this

Twenty-third Day of March, 2004

JON W. DUDAS
*Acting Director of the United States Patent and Trademark Office*